United States Patent
Gubanov

(10) Patent No.: US 10,754,880 B2
(45) Date of Patent: Aug. 25, 2020

(54) METHODS AND SYSTEMS FOR GENERATING A REPLACEMENT QUERY FOR A USER-ENTERED QUERY

(71) Applicant: YANDEX EUROPE AG, Lucerne (CH)

(72) Inventor: Sergey Dmitrievich Gubanov, Tambov (RU)

(73) Assignee: YANDEX EUROPE AG, Lucerne (CH)

(*) Notice: Subject to any disclaimer, the term of this patent is extended or adjusted under 35 U.S.C. 154(b) by 455 days.

(21) Appl. No.: 15/891,569

(22) Filed: Feb. 8, 2018

(65) Prior Publication Data

US 2019/0034435 A1    Jan. 31, 2019

(30) Foreign Application Priority Data

Jul. 27, 2017    (RU) ................................ 2017127002

(51) Int. Cl.
*G06F 16/00* (2019.01)
*G06F 16/332* (2019.01)
(Continued)

(52) U.S. Cl.
CPC ...... *G06F 16/3322* (2019.01); *G06F 16/3347* (2019.01); *G06F 16/90324* (2019.01); *G06N 5/022* (2013.01); *G06N 20/00* (2019.01)

(58) Field of Classification Search
CPC ............. G06F 16/3322; G06F 16/3347; G06F 16/90324; G06N 20/00; G06N 5/022
See application file for complete search history.

(56) References Cited

U.S. PATENT DOCUMENTS

| 7,444,324 B2 | 10/2008 | Ortega et al. |
| 7,657,507 B2 | 2/2010 | Shi et al. |

(Continued)

FOREIGN PATENT DOCUMENTS

| RU | 2454712 C2 | 6/2012 |
| WO | 2000057291 A1 | 9/2000 |

(Continued)

OTHER PUBLICATIONS

Search Report with regard to the counterpart RU Patent Application No. 2017127002 completed Apr. 5, 2019.

(Continued)

*Primary Examiner* — Diedra McQuitery
(74) *Attorney, Agent, or Firm* — BCF LLP

(57) ABSTRACT

A method and system for generating a replacement query for a user-entered query is provided. The user-entered query is received by a service that never used it and is potentially erroneously entered. The method comprises selecting a set of queries for the user-entered query from past queries based on string similarity. The method comprises retrieving past-query-interdependence data indicative of past transitions between each pair of queries in the set of queries. The method comprises selecting an approximated query from the set of queries based on string similarity and usage frequency. The method comprises, for each pair of approximated query and one of the set of queries, generating a vector based on past-query-interdependence data between the approximated query and respective one of the set of queries. Each vector can be used as an approximated vector. The method comprises generating ranking parameters for the approximated vectors and determining the replacement query.

20 Claims, 9 Drawing Sheets

(51) Int. Cl.
  *G06F 16/33* (2019.01)
  *G06F 16/9032* (2019.01)
  *G06N 20/00* (2019.01)
  *G06N 5/02* (2006.01)

(56) References Cited

U.S. PATENT DOCUMENTS

| | | | |
|---|---|---|---|
| 8,577,913 | B1 | 11/2013 | Hansson et al. |
| 8,676,827 | B2 | 3/2014 | Metzler et al. |
| 2008/0243827 | A1 | 10/2008 | Sarma et al. |
| 2011/0295897 | A1* | 12/2011 | Gao ............ G06F 16/951 707/780 |
| 2013/0124492 | A1 | 5/2013 | Gao et al. |
| 2014/0207746 | A1* | 7/2014 | Song ............ G06F 16/3322 707/706 |
| 2016/0063094 | A1* | 3/2016 | Udupa ............ G06F 16/3322 707/748 |
| 2016/0299883 | A1* | 10/2016 | Zhu ............ G06Q 50/01 |
| 2016/0350655 | A1 | 12/2016 | Weiss et al. |

FOREIGN PATENT DOCUMENTS

| | | |
|---|---|---|
| WO | 2006105639 A1 | 10/2006 |
| WO | 2008/076887 A1 | 6/2008 |

OTHER PUBLICATIONS

English Abstract for RU2454712 retrieved on Espacenet on Jun. 17, 2019.

Gao et al., "A Large Scale Ranker-Based System for Search Query Spelling Correction", Microsoft Research/Microsoft Corporation, Redmond, WA, USA; Microsoft Corporation, Munich, Germany, 9 pages.

Broder et al., "Online Expansion of Rare Queries for Sponsored Search", WWW, 2009, Madrid, Spain, ACM 978-1-60558-487-4/09/04, pp. 511-520.

Hasan et al., "Spelling Correction of User Search Queries through Statistical Machine Translation", Proceedings of the 2015 Conference on Empirical Methods in Natural Language Processing, Lisbon, Portugal, 17-21, 2015, pp. 451-460.

Duan et al., "Online Spelling Correction for Query Completion", WWW 2011, 2011, Hyderabad, India, ACM 978-1-4503-0632-4/11/03, pp. 117-126.

Mitra et al., "Query Auto-Completion for Rare Prefixes", CIKM'15, 2015, Melbourne, Australia, ACM. ISBN 978-1-4503-3794-6/15/10, 4 pages.

Peterson, "Computer Programs for Detecting and Correcting Spelling Errors", Computing Practices, 1980, vol. 23, No. 12, pp. 676-687.

Broder et al., "Robust Classification of Rare Queries Using Web Knowledge", SIGIR'07, 2007, Amsterdam, The Netherlands., ACM 978-1-59593-597-7/07/0007, 8 pages.

\* cited by examiner

METHODS AND SYSTEMS FOR GENERATING A REPLACEMENT QUERY FOR A USER-ENTERED QUERY

CROSS-REFERENCE

The present application claims priority to Russian Patent Application No. 2017127002, entitled "Methods and Systems for Generating a Replacement Query for a User-Entered Query", filed Jul. 27, 2017, the entirety of which is incorporated herein by reference.

FIELD OF TECHNOLOGY

The present technology relates to computer-implemented query processing and, more specifically, to methods and systems for generating a replacement query for a user-entered query.

BACKGROUND

Spelling errors in queries, more particularly spelling errors in search queries that are submitted to conventional search engines, often make it difficult to conduct proper searches and to provide relevant search results in response thereto.

In some cases, misspelled queries are more difficult to correct using common dictionary-based approaches than misspelled words in a regular-written text. This is due to the fact that search queries often include words that may not be well-established in a given language, such as proper nouns or names. Moreover, unlike well-established words in a given language, new queries emerge constantly.

In order to overcome these issues, some research has been conducted for developing query spell correctors that are focused on the use of search logs, rather than human-compiled lexicons, in order to infer knowledge about spellings and word usages in search queries.

Generally speaking, conventional query spell correctors that use search logs are developed based on a principle that for a given misspelled query prior information regarding the given misspelled query is available in the search logs. The given misspelled query prior information may be indicative of prior transitions between the given misspelled query and potential corrections therefor. Such prior information may be explicit: a user explicitly preformed a new search according to a new query that is substantially similar to the given misspelled query right after performing the search according to the given misspelled query. Such information may also be implicit: the user performed a search according to the misspelled query but the search engine detected a potential misspell and presented the user with search results which were responsive to the corrected query and with which search results the user sufficiently interacted (without the user requiring to explicitly enter a new search query).

However, as previously mentioned, since new queries emerge constantly, search logs lack data or prior information regarding transitions associated with these new queries. Same may apply to rare misspells of a given search query. As such, in the eventuality that a new query is misspelled or erroneously entered by a user, conventional query spell correctors that use search logs are ill-suited for providing potential corrections for these potentially erroneously newly entered queries.

For the foregoing reasons, there is a need for new methods and systems for generating replacement queries for new user-entered queries that have been potentially erroneously entered.

SUMMARY

Embodiments of the present technology have been developed based on developers' appreciation that while search logs are used by query spell correctors for correcting misspelled queries, conventional query spell correctors employing search logs are not well suited to correct entered queries that are potentially erroneously entered since erroneously entered queries may be submitted to the search engine for the first time and, therefore, the search logs may lack information regarding such newly erroneously entered queries. Embodiments of the present technology have been developed based on developers' appreciation of at least one technical problem associated with the prior art solutions. Therefore, developers have devised methods and systems for generating a replacement query for a user-entered query that can be used even in those circumstances where the user-entered query has never been used by a given service and where the user-entered query is potentially erroneously entered. In other words, the embodiments of the present technology can be used to correct a misspelled query even when the system may lack misspelled query data due to the fact that it is a rare or is a misspell that was never submitted.

In a first aspect of the present technology, there is provided a method of generating a replacement query for a user-entered query. The user-entered query has been received in association with a computer-executed service provided by a server. The user-entered query has never been used in the computer-executed service. The user-entered query is potentially erroneously entered. The method is executable by the server. The method comprises selecting, by the server, a set of replacement candidate queries for the user-entered query from a plurality of past queries used in the computer-executed service based on string similarity between the user-entered query and each one of the plurality of past queries. The method also comprises for the set of replacement candidate queries, retrieving, by the server, an indication of past-query-interdependence data. The past-query-interdependence data is indicative of past transitions between each pair of replacement candidate queries in the set of replacement candidate queries. The user-entered query is not included in the set of replacement candidate queries. The past-query-interdependence data is not indicative of any past transitions between the user-entered query and any one of the set of replacement candidate queries. The method also comprises selecting, by the server, an approximated query from the set of replacement candidate queries based on: (i) the string similarity between the user-entered query and each one of the set of replacement candidate queries; and (ii) a usage frequency of each one of the set of replacement candidate queries where the user frequency is based on previous user interactions with the computer-executed service. The method also comprises for each pair consisting of the approximated query and a given one of the set of replacement candidate queries, generating, by the server, a respective feature vector based on the past-query-interdependence data between the approximated query and the respective given one of the set of replacement candidate queries. A given feature vector is representative of the past transitions between the approximated query and the respective one of the set of replacement candidate queries. The respective feature vector is to be used as a respective approximated feature vector that is representative of estimated past transitions between the user-inputted query and the respective one of the set of replacement candidate queries. The method also comprises generating, by the server, a respective ranking parameter for each approximated feature vector. The ranking parameter of a given approximated feature vector is indicative of a probability of the respective one of the set of replacement candidate queries being the replacement query for the user-entered query. The method also comprises determining, by the server, the replacement query for the user-entered query amongst the set of replacement candidate queries based on the respective ranking parameters.

In some embodiments of the method, the selecting the approximated query from the set of replacement candidate queries comprises selecting, by the server, more than one approximated queries from the set of replacement candidate queries. For each pair consisting of a given one of the more than one approximated queries and a given one of the set of replacement candidate queries, the generating the respective feature vector comprises generating, by the server, the respective feature vector based on the past-query-interdependence data between the respective given one of the more than one approximated queries and the respective given one of the set of replacement candidate queries. The given feature vector is representative of the past transitions between the respective given one of the more than one approximated queries and the respective one of the set of replacement candidate queries. The method further comprises consolidating, by the server, more than one feature vectors that are representative of the past transitions between each of the more than one approximated queries and a given one of the set of replacement candidate queries into a respective consolidated feature vector. The respective consolidated feature vector is to be used as the respective approximated feature vector that is representative of the estimated past transitions between the user-inputted query and the respective one of the set of replacement candidate queries.

In some embodiments of the method, the selecting the set of replacement candidate queries for the user-entered query from the plurality of past queries used in the computer-executed service based on string similarity between the user-entered query and each one of the plurality of past queries comprises computing, by the server, an edit distance between the user-entered query and each one of the plurality of past queries.

In some embodiments of the method, the edit distance is a Levenshtein distance.

In some embodiments of the method, the plurality of past queries are ranked based on the respectively associated Levenshtein distances and the selecting the set of replacement candidate queries comprises selecting, by the server, a predetermined number of most highly ranked past queries of the plurality of past queries.

In some embodiments of the method, the selecting the more than one approximated queries from the set of replacement candidate queries comprises mapping, by the server, each one of the set of replacement candidate queries based on (i) the string similarity to the user-entered query and (ii) the usage frequency. The selecting the more than one approximated queries from the set of replacement candidate queries also comprises selecting, by the server, all replacement candidate queries of the set of replacement candidate queries that are mapped in an acceptable approximation hypothesis region as the more than one approximated queries. The acceptable approximation hypothesis region is bound by a usage frequency threshold line and a string similarity threshold line.

In some embodiments of the method, the usage frequency threshold line coincides with a usage frequency threshold value. All usage frequency values being at least one of equal and lower to the usage frequency threshold value are acceptable usage frequency values of an approximation hypothesis characteristic of the usage frequency. The string similarity threshold line coincides with a string similarity threshold line. All string similarity values being at least one of equal and lower to the string similarity threshold value are acceptable string similarity values of an approximation hypothesis characteristic of the string similarity.

In some embodiments of the method, the consolidating the more than one feature vectors into the respective consolidated feature vector comprises at least one of (i) computing, by the server, a mean vector based on the more than one feature vectors and (ii) computing, by the server, an average vector based on the more than one feature vectors.

In some embodiments of the method, the generating the respective ranking parameter for each approximated feature vector is executable by a machine learned algorithm (MLA).

In some embodiments of the method, the MLA is a linear ranker.

In another aspect of the present technology, there is provided a server for generating a replacement query for a user-entered query. The user-entered query is received in association with a computer-executed service provided by the server. The user-entered query has never been used in the computer-executed service. The user-entered query is potentially erroneously entered. The server is configured to select a set of replacement candidate queries for the user-entered query from a plurality of past queries used in the computer-executed service based on string similarity between the user-entered query and each one of the plurality of past queries. The server is also configured to for the set of replacement candidate queries, retrieve an indication of past-query-interdependence data. The past-query-interdependence data is indicative of past transitions between each pair of replacement candidate queries in the set of replacement candidate queries. The user-entered query is not included in the set of replacement candidate queries. The past-query-interdependence data is not indicative of any past transitions between the user-entered query and any one of the set of replacement candidate queries. The server is also configured to select an approximated query from the set of replacement candidate queries based on (i) the string similarity between the user-entered query and each one of the set of replacement candidate queries and (ii) a usage frequency of each one of the set of replacement candidate queries. The user frequency is based on previous user interactions with the computer-executed service. The server is also configured to for each pair consisting of the approximated query and a given one of the set of replacement candidate queries, generate a respective feature vector based on the past-query-interdependence data between the approximated query and the respective given one of the set of replacement candidate queries. A given feature vector is representative of the past transitions between the approximated query and the respective one of the set of replacement candidate queries. The respective feature vector is to be used as a respective approximated feature vector that is representative of estimated past transitions between the user-inputted query and the respective one of the set of replacement candidate queries. The server is also configured to generate a respective ranking parameter for each approximated feature vector.

The ranking parameter of a given approximated feature vector is indicative of a probability of the respective one of the set of replacement candidate queries being the replacement query for the user-entered query. The server is also configured to determine the replacement query for the user-entered query amongst the set of replacement candidate queries based on the respective ranking parameters.

In some embodiments of the server, the server is configured to select the approximated query from the set of replacement candidate queries comprises the server configured to select more than one approximated queries from the set of replacement candidate queries. For each pair consisting of a given one of the more than one approximated queries and a given one of the set of replacement candidate queries, the server is configured to generate the respective feature vector comprises the server configured to generate the respective feature vector based on the past-query-inter-dependence data between the respective given one of the more than one approximated queries and the respective given one of the set of replacement candidate queries. The given feature vector is representative of the past transitions between the respective given one of the more than one approximated queries and the respective one of the set of replacement candidate queries. The server is further configured to consolidate more than one feature vectors that are representative of the past transitions between each of the more than one approximated queries and a given one of the set of replacement candidate queries into a respective consolidated feature vector. The respective consolidated feature vector is to be used as the respective approximated feature vector that is representative of the estimated past transitions between the user-inputted query and the respective one of the set of replacement candidate queries.

In some embodiments of the server, the server is configured to select the set of replacement candidate queries for the user-entered query from the plurality of past queries used in the computer-executed service based on string similarity between the user-entered query and each one of the plurality of past queries comprises the server configured to compute an edit distance between the user-entered query and each one of the plurality of past queries.

In some embodiments of the server, the edit distance is a Levenshtein distance.

In some embodiments of the server, the plurality of past queries are ranked based on the respectively associated Levenshtein distances. The server is configured to select the set of replacement candidate queries comprises the server configured to select a predetermined number of most highly ranked past queries of the plurality of past queries.

In some embodiments of the server, the server is configured to select the more than one approximated queries from the set of replacement candidate queries comprises the server configured to map each one of the set of replacement candidate queries based on (i) the string similarity to the user-entered query and (ii) the usage frequency. It also comprises the server configured to select all replacement candidate queries of the set of replacement candidate queries that are mapped in an acceptable approximation hypothesis region as the more than one approximated queries. The acceptable approximation hypothesis region is bound by a usage frequency threshold line and a string similarity threshold line.

In some embodiments of the server, the usage frequency threshold line coincides with a usage frequency threshold value. All usage frequency values being at least one of equal and lower to the usage frequency threshold value are acceptable usage frequency values of an approximation hypothesis characteristic of the usage frequency. The string similarity threshold line coincides with a string similarity threshold line. All string similarity values being at least one of equal and lower to the string similarity threshold value are acceptable string similarity values of an approximation hypothesis characteristic of the string similarity.

In some embodiments of the server, the server is configured to consolidate the more than one feature vectors into the respective consolidated feature vector comprises the server configured to at least one of (i) compute a mean vector based on the more than one feature vectors and (ii) compute an average vector based on the more than one feature vectors.

In some embodiments of the server, the server is configured to generate the respective ranking parameter for each approximated feature vector by executing a machine learned algorithm (MLA).

In some embodiments of the server, the MLA is a linear ranker.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
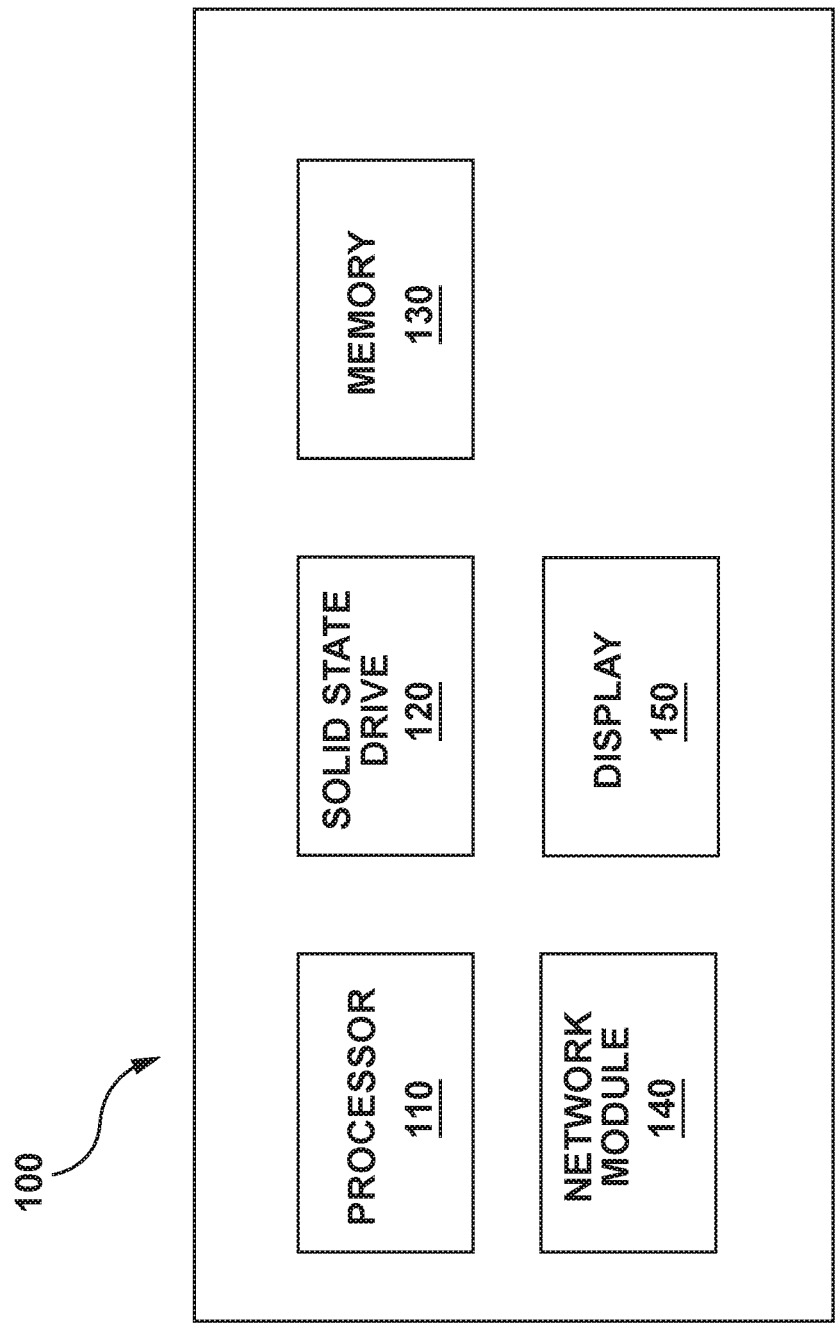
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory, a network module 140 and a display 150. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for displaying information to a user of the computer system 100 as will be described in further detail below. For example, the program instructions may be part of a browser application 250 (see FIG. 2) executable by the processor 110. The network module 140 is not particularly limiting and, generally speaking, allows communication between different computer systems, servers and/or other devices.

Figure 2:
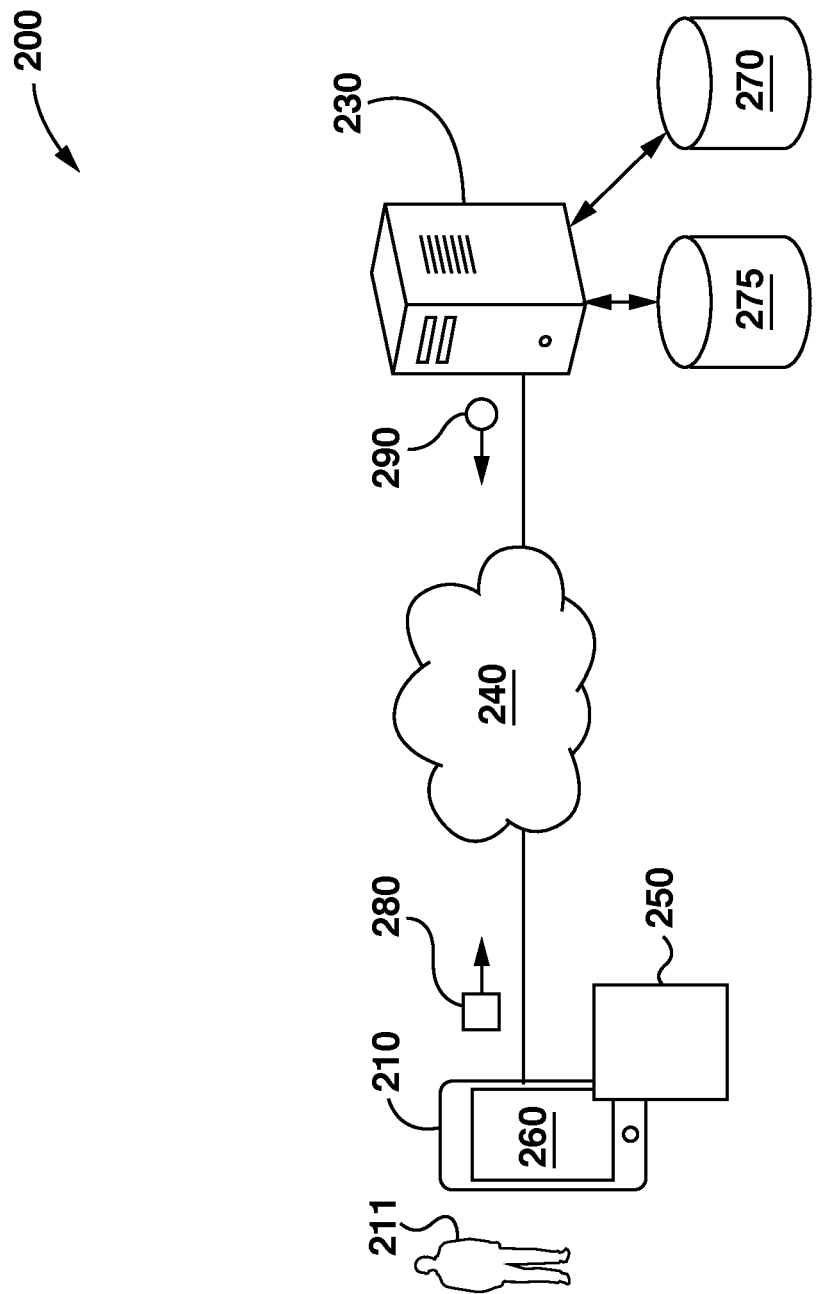
FIG. 2 depicts a networked computing environment being suitable for use with some implementations of the present technology.

FIG. 2 illustrates a networked computing environment 200 suitable for use with some embodiments of the systems and/or methods of the present technology. The networked computing environment 200 comprises an electronic device 210 associated with a user 211 (who can interact with the electronic device 210) and a server 230 in communication with the electronic device 210 via a communications network 240 (e.g. the Internet or the like, as will be described in greater detail herein below).

The implementation of the electronic device 210 is not particularly limited, but as an example, the electronic device 210 may be implemented as a wireless communication device such as a mobile telephone (e.g. a smart phone or a radio-phone), a tablet, a personal computer and the like. However in FIG. 2, the electronic device 210 is depicted as the smart phone.

The electronic device 210 may comprise some or all of the components of the computer system 100 depicted in FIG. 1. In some embodiments, the electronic device 210 comprises the network module 140 for communicating with the server 230 via the communications network 240, the processor 110, the memory 130, and the display 150 such as a touch-screen for example. The electronic device 210 comprises hardware and/or software and/or firmware, or a combination thereof, for generating and transmitting an initial data packet 280 to the server 230 via the communications network 240. How the electronic device 210 is configured to generate and transmit the initial data packet 280 as well as the content of the initial data packet 280 will be further described herein below.

It should be noted that the fact that the electronic device 210 is associated with the user 211 does not need to suggest or imply any mode of operation—such as a need to log in, a need to be registered or the like. In other words, the association between the user 211 and the electronic device 210 denotes the assumption that the user 211 has the electronic device 210 and is able to interact therewith.

In some embodiments of the present technology, the communications network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link (not separately numbered) between the electronic device 210 and the communications network 240 is implemented will depend inter alia on how the electronic device 210 is implemented.

Merely as an example and not as a limitation, in those embodiments of the present technology where the electronic device 210 is implemented as a wireless communication device such as the smart phone, the communication link can be implemented as a wireless communication link. Examples of wireless communication links include, but are not limited to, a 3G communication network link, a 4G communication network link, and the like. The communications network 240 may also use a wireless connection with the server 230.

In some embodiments of the present technology, the server 230 is implemented as a conventional computer server. In one non-limiting example, the server 230 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 230 may be distributed and may be implemented via multiple servers.

In some embodiments of the present technology, the server 230 may host one or more computer-executed services such as a search engine, for example. In other words, the server 230 may be under control and/or management of a search engine provider (not depicted), such as, for example, an operator of the Yandex™ search engine. As such, the server 230 may be configured to execute one or more searches responsive to queries submitted thereto by users of the search engine. The server 230 may be configured to generate and transmit to the electronic device 210 a response data packet 290 via the communications network 240. How the server 230 is configured to generate and transmit the response data packet 290 as well as the content of the response data packet 290 will be further described herein below.

The server 230 is communicatively coupled to a lexicon database 275 and to a query log database 270. In FIG. 2, the lexicon database 275 and the query log database 270 are depicted as being directly communicatively coupled to the server 230, however, in some embodiments, the lexicon database 275 and the query log database 270 may be communicatively coupled to the server 230 via the communications network 240. Although the lexicon and query log databases 275 and 270 are depicted in FIG. 2 as separate entities, in some embodiments of the present technology, both the lexicon and the query log databases 275 and 270 may be implemented as part of a single entity (i.e., a unified database comprising information that is stored in both the lexicon and the query log databases 275 and 270).

Generally speaking, the server 230 hosting one or more computer-executed services, such as search engines, may make use of lexical information collected or otherwise acquired from external resources (not depicted), which is then stored in the lexicon database 275, that pertains to one or more collections of well-established words in various languages. The lexicon database 275 may be accessed by the server 230 via a bidirectional data-path (not numbered). The lexical information can be extracted, stored and processed, and then used by the server 230.

It can be said that the lexicon database 275 may be used by the server 230 to evaluate entity features of different words. In other words, the lexicon database 275 may be used by the server 230 to evaluate whether a given word is generally accepted to be associated with a known entity. For example, the server 230 may be configured to use the lexicon database 275 to verify whether a given word is likely to be a proper noun related to a known entity. It can also be said that the lexicon database 275 may be used by the server 230 to evaluate dictionary features of different words. In other words, the lexicon database 275 may be used by the server 230 to evaluate whether a given word is classified. For example, the server 230 may be configured to use the lexicon database 275 to verify whether a given word is recorded in one or more human-compiled dictionaries.

The lexical information stored in the lexicon database 275 may also comprise lexemes as well as respectively associated inflectional paradigms. Generally speaking, due to grammatical rules of various languages, a given lexeme may be associated with a set of given inflectional paradigms. For example, if the given lexeme is "ride", the set of given inflectional paradigms may comprise the given inflectional paradigms "riding", "ridden", "rode" and the like. In another example, if the given lexeme is "sing", the set of given inflectional paradigms may comprise the given inflectional paradigms "singing", "sang", "sung" and the like. The lexicon database 275 may be configured to store data relating to thousands of lexemes and thousands of respectively associated inflectional paradigms collected or otherwise acquired from external resources such as dictionaries or documents.

It should be noted that the given lexemes and the respectively associated given inflectional paradigms have been exemplified for the English grammar and ease of understanding only and that lexemes and respectively associated inflectional paradigms for other grammars (i.e., Russian grammar, French grammar, German grammar, Spanish grammar, and the like) may be contemplated in some implementations without departing from the scope of the present technology.

Generally speaking, the server 230 hosting one or more computer-executed services, such as search engines, may make use of historical information collected from a large quantity of previously executed queries that are submitted thereto and may store them in the query log database 270. The query log database 270 may be accessed by the server 230 via a bidirectional data-path (not numbered). From each past query, diverse information can be extracted, stored and processed, and then used by the server 230.

In some embodiments, the query log database 270 may comprise one or more collections of data relating to queries that users have previously submitted to the server 230. In other words, the server 230 may be configured to populate the query log database 270 based on user interactions with the computed-executed services hosted thereby. In other embodiments, however, the server 230 may be configured to communicate and use external resources in order to supplement the population of the query log database 270.

In some embodiments, the query log database 270 may be configured to store "past-query-specific data" associated with each past query submitted to the search engine of the server 230. For example, the past-query-specific data may comprise click-through data from past queries submitted to the search engine of the server 230. This click-through data may be stored in the form of records indicating that given documents have been clicked through by users of the search engine when they were exploring the search results for their respective past queries.

Additionally, the past-query-specific data may comprise additional statistical data associated with past query submissions to the search engine of the server 230. For example, a usage frequency of a given past query, which indicates how often a given past query has been submitted to the server 230, may be stored in the server 230 in association with the given past query.

It can be said that the query log database 270 may be used by the server 230 to evaluate frequency features of different words. For example, the server 230 may be configured to use the query log database 270 in order to verify whether a usage frequency or any other predetermined-type frequency of a given word is above predetermined respective thresholds and/or within predetermined threshold intervals.

It can also be said that the query log database 270 may be used by the server 230 to evaluate phonetic-form similarity features between different words. For example, the server 230 may be configured to use the query log database 270 in order to verify whether two words are phonetically similar, or in other words, whether the two words are representative of sounds which share phonetic features and are frequently found as variants of a single phonological unit in a given language. To that end, the server 230 may implement known phonetic analysis techniques in order to be configured to evaluate phonetic-form similarity features between different words such as words that form the queries stored in the query log database 270.

It can also be said that the query log database 270 may be used by the server 230 to evaluate surface-form similarity features between different words. For example, the server 230 may be configured to use the query log database 270 in order to verify whether two words are different in character patterns, e.g., whether a first of the two words may be transformed from a second of the two words by adding an apostrophe and/or by adding a character and/or by removing a character and the like.

In additional embodiments, the query log database 270 may be configured to store "past-query-interdependence data" which is indicative of past transitions between a pair of past queries submitted to the search engine of the server 230. The past-query-interdependence data may be extracted from search session data associated with past search sessions initiated by users of the search engine.

The search session data may comprise information associated with a plurality of subsets of past queries that were submitted by users during distinct search sessions. The search session data may provide relational information regarding a given subset of past queries such as a sequence of past queries submitted by a given user within a given past search session, whether a given past query in a given past search session was explicitly corrected by the user (such as a submission of a subsequent past query substantially similar to the given past query), whether a given past query in the search session was implicitly corrected (such as when the search engine provided search results to the given user in response to a corrected past query instead of in response to the given past query and the given user significantly interacted with these search results), and the like.

Put another way, the past-query-interdependence data for a given past query may be indicative of past transitions, which can be retrieved by the server 230 from the query log database 270, between the given past query submitted to the search engine and every other past query submitted to the search engine. As such, the past-query-interdependence data for a given pair of past queries may be indicative of past transitions, which can be retrieved by the server 230 from the query log database 270, between a first past query within the given pair of past queries submitted to the search engine and a second past query within the given pair of past queries submitted to the search engine.

As previously mentioned, the information stored within the lexicon database 275 and the query log database 270, as well as their respective functionalities, may be implemented by a single unified database without departing from the scope of the present technology.

Additionally or alternatively, it should also be noted that, in some implementations of the present technology, the server 230 may use a combination of the lexicon database 275 and of the query log database 270 in order to evaluate any one of the surface-form similarity features, the phonetic-form similarity features, the entity features, the dictionary features and the frequency features of different words or past queries, without departing from the scope of the present technology.

In some embodiments of the present technology, the electronic device 210 may be configured to execute the browser application 250. Generally speaking, the purpose of the browser application 250 is to enable the user 211 to access one or more computer-executed services provided by the server 230 via the communications network 240. The browser application 250 generally comprises a command interface (not depicted) and a browsing interface (not depicted) for allowing the user 211 to input user-entered queries and relaying those user-entered queries to the search engine provided by the server 230.

Generally speaking, a given user-entered query may be a textual string of characters formed by one or more words that the user 211 inputs via the display 150 of the electronic device 210. As an example, a given user-entered query may be: "motorcycle", "Canada", "Asia", "patent" and the like. However, the user 211 may have mistyped, misspelled, or otherwise erroneously entered at least one word of the given user-entered query while inputting it via the display 150. The user 211 may erroneously enter the given user-entered queries due to many different reasons such as: quick typing or entering of the given user-entered query via the display 150, adjacency of keys on a virtual (or physical) keyboard, inconsistent grammatical rules, ambiguous word breaking and the like.

For example, instead of inputting the given user-entered query "motorcycle", the user 211 may have inputted "motorclye" or "mtorcycle" or "motorcyle" and the like. Therefore, it is contemplated that in some embodiments of the present technology, the user-entered query may be potentially erroneously entered by the user 211 into the browser application 250 via the display 150 of the electronic device 210.

It should be noted that, although some browser applications implement spell correcting functionalities, the browser application 250, in some cases, may not be configured to correct a given potentially erroneously entered user-entered query and/or may not be able to recognize that the given user-entered query is erroneously entered. As a result, the browser application 250 may be configured to trigger the electronic device 210 to generate the initial data packet 280 comprising information indicative of the user-entered query entered into the browser application 250 by the user 211 even though this user-entered query may be potentially erroneously entered.

Let it be assumed that the user 211 interacts with the display 150 and enters the user-entered query "oligopsony" into the browser application 250. As a result, the electronic device 210 may be configured to generate the initial data packet 280 containing information regarding the user-entered query "oligopsony" and may transmit the initial data packet 280 to the server 230 via the communications network 240. This user-entered query may then be received by the search engine provided by the server 230.

In some embodiments, the server 230 may be configured to submit a search to the lexicon database 275 in order to verify whether the lexical information comprises the user-entered query. If the lexical information comprises the user-entered query, the server 230 may establish that the user-entered query is part of well-established words in a given language (i.e., in this case a well-established word in English language). If the lexical information does not comprise the user-entered query, the server 230 may determine, in some embodiments, that the user-entered query is potentially erroneously entered.

The server 230 may be configured to submit a search to the query log database 270 in order to identify whether the user-entered query has been previously submitted to the search engine provided thereby (i.e., whether a given past query is identical to the user-entered query). If the query log database 270 does not comprise the user-entered query, the server 230 may determine, in some embodiments, that the user-entered query is potentially erroneously entered.

Figure 3:
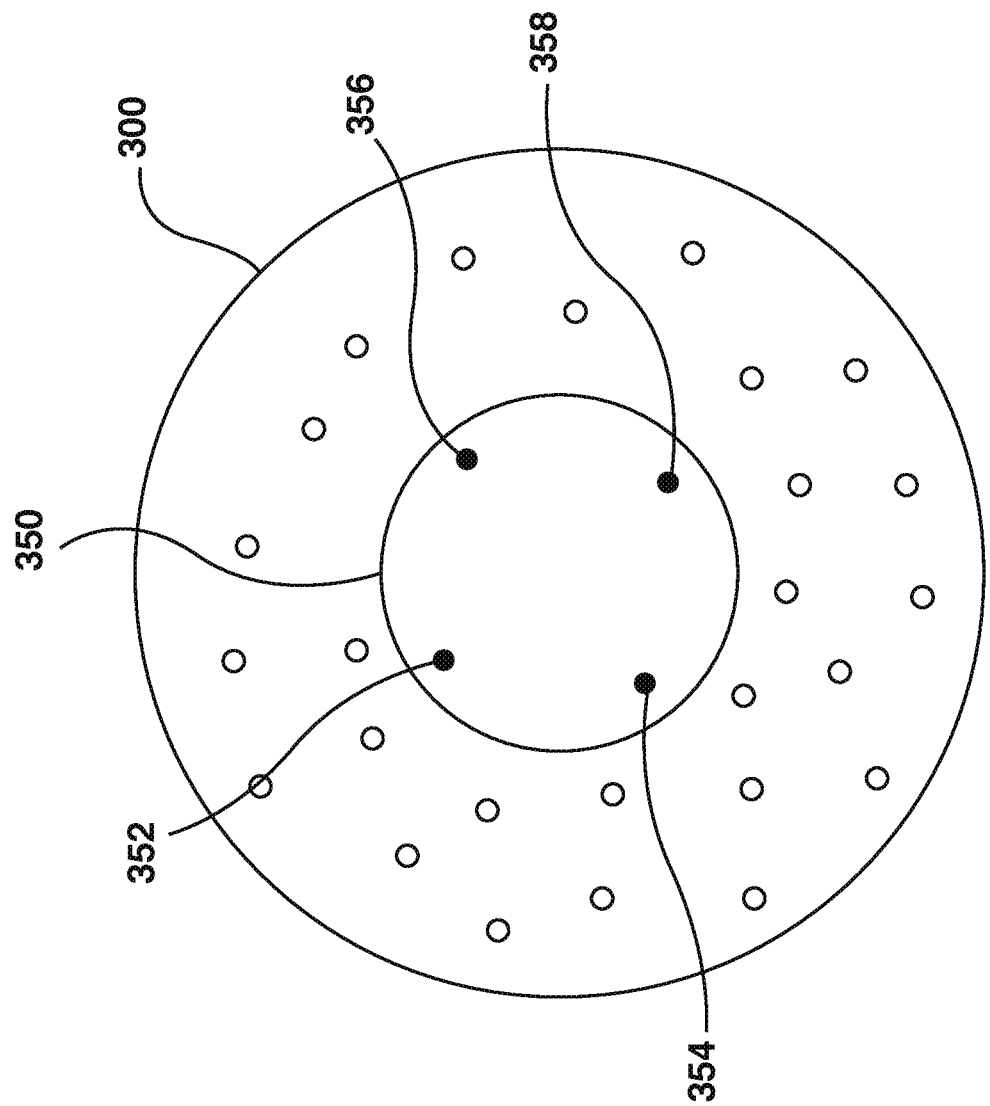
FIG. 3 schematically depicts a plurality of past queries submitted or otherwise used by a computer-executed service of a server of the networked computing environment of FIG. 2.

With reference to FIG. 3, there is depicted a plurality of past queries 300 that is stored in the query log database 270. The server 230 may be configured to access the query log database 270 and retrieve an indication of the plurality of past queries 300 therefrom. As previously mentioned, the query log database 270 may store information relating to past queries that users have previously submitted to the server 230. As such, the plurality of past queries 300 comprises past queries that users have previously submitted to the server 230.

The server 230 may be configured to evaluate string similarity between the user-entered query and each one of the plurality of past queries 300 by computing an edit distance between the user-entered query and each one of the plurality of past queries 300.

Generally speaking, the edit distance is a way of quantifying how dissimilar two character strings are to one another by counting a minimum number of operations required to transform one string into the other one. For example, the server 230 may be configured to compute a Levenshtein distance between the user-entered query and each one of the plurality of past queries 300. The Levenshtein distance is known in the art as a type of edit distance which allows deletion, insertion and substitution of characters.

In some embodiments of the present technology, the plurality of past queries 300 may be pre-filtered via known techniques in order to reduce the number of past queries to be compared in respect to string similarity to the user-entered query. For example, the plurality of past queries 300 may be pre-filtered based on their respective character string lengths.

Additionally or optionally, the server 230 may be configured to compute other types of edit distances between the user-entered query and each one of the plurality of past queries 300 such as a Longest Common Subsequence (LCS) distance, a Hamming distance, a Damerau-Levenshtein distance and a Jaro distance, which are all types of edit distances that are known in the art. The computation of the edit distance for each past query within the plurality of past queries 300 according to any one of the different types of edit distances described above will depend inter alia on specific implementations of the present technology.

After computing a respective edit distance between each one of the plurality of past queries 300 and the user-entered query, the server 230 may be configured to verify whether the user-entered query is identical to any one of the plurality of past queries 300 by verifying whether any one of the plurality of past queries 300 has a respective edit distance of zero with respect to the user-entered query. In other words, the server 230 may be configured to determine whether the user-entered query has ever been submitted to the search engine.

In summary, if the server 230 determines that the user-entered query is not part of the lexical information of the lexicon database 275 and is not identical to any one of the plurality of past queries 300, the server 230 may determine that the user-entered query has never been submitted to or otherwise used by the search engine and that the user-entered query is potentially erroneously entered.

Optionally, other techniques known in the art may be employed in order to determine that the user-entered query has never been submitted to or otherwise used by the search engine and that the user-entered query is potentially erroneously entered. Irrespective of a particular technique used to make the latter determination by the server 230, in response to the latter determination, the server 230 may be configured to execute a method 900 (see FIG. 9) of generating a given replacement query for a given user-entered query that has never been submitted to or otherwise used by the search engine and that is potentially erroneously entered.

In some embodiments of the present technology, the server 230 may be configured to select a set of replacement candidate queries 350 from the plurality of past queries 300 based on string similarity between the user-entered query "oligopsony" and each one of the plurality of past queries 300.

In some embodiments, in order to select the set of replacement candidate queries 350, the server 230 may be configured to rank the plurality of past queries 300 according to the respective edit distances where a given one of the plurality of past queries 300 associated with a smallest edit distance is ranked first and another given one of the plurality of past queries 300 associated with a largest edit distance is ranked last. In this case, the server 230 may select, for example, at most 20 most highly ranked past queries from the plurality of past queries 300 as the set of replacement candidate queries 350.

Alternatively, in order to select the set of replacement candidate queries 350, the server 230 may be configured to compare the edit distance associated with each one of the plurality to past queries 300 with a predetermined edit distance threshold and select the past queries that are associated with respective edit distances that are lower than the predetermined edit distance threshold as the set of replacement candidate queries 350.

As such, the set of replacement candidate queries 350 may comprise only the most similar past queries (i.e., those similar past queries associated with small edit distance) amongst the plurality of past queries 300 to the user-entered query.

Let's assume that based on string similarity between the user-entered query "oligopsony" and each one of the plurality of past queries 300, the server 230 selected four past queries 352, 354, 356 and 358, namely "oligophsony", "oligospoony", "oligopoly" and "oligophrenia", respectively, as part of the set of replacement candidate queries 350. It should be noted that the server 230 selecting the past queries 352, 354, 356 and 358 as the set of replacement candidate queries 350 is described solely for the sake of simplicity and that, in other implementations, other past queries may be selected as the set of replacement candidate queries 350 and that another total number of past queries, other than four past queries, may be selected by the server 230 as part of the set of replacement candidate queries 350, without departing from the scope of the present technology.

For explanation purposes only, the edit distance between the user-entered query "oligopsony":
and the past query 352 "oligophsony" is "1";
and the past query 354 "oligospoony" is "2";
and the past query 356 "oligopoly" is "2";
and the past query 358 "oligophrenia" is "5".

For reference purposes only, the past queries 352, 354, 356 and 358 will, from now on, be referred to as replacement candidate queries 352, 354, 356 and 358, respectively, of the set of replacement candidate queries 350.

It should be recalled, since the user-entered query has never been submitted to the search engine of the server 230, the user-entered query is not included in either one of the plurality of past queries 300 and the set of replacement candidate queries 350. Additionally, since the user-entered query has never been submitted to the search engine of the server 230, the query log database 270 does not store any past-query-specific data associated with the user-entered query. Moreover, since the user-entered query has never been submitted to the search engine of the server 230, the past-query-interdependence data stored in the query log database 270 is not indicative of any past transitions between the user-entered query and any one of the plurality of past queries 300. Consequently, the past-query-interdependence data stored in the query log database 270 is not indicative of any past transitions between the user-entered query and any one of the set of replacement candidate queries 350 (i.e., a smaller subset of the plurality of past queries 300).

In some embodiments of the present technology, the server 230 may be configured to use at least one replacement candidate query from the set of replacement candidate queries 350 as an approximation of the user-entered query if the at least one replacement candidate query is associated with acceptable values of approximation hypothesis characteristics. In other words, the server 230 may select an approximated query for the user-entered query if at least one replacement candidate query from the set of replacement candidate queries 350 is associated with acceptable values of approximation hypothesis characteristics.

These approximation hypothesis characteristics are based on the string similarity between the user-entered query and each one of the set of replacement candidate queries 350 and a usage frequency of each one of the set of replacement candidate queries 350. These approximation hypothesis characteristics allow verifying whether the at least one replacement candidate query is sufficiently similar to the user-entered query (e.g., composed of sufficiently similar character strings) and whether the at least one replacement candidate query is rarely used (e.g., associated with a low usage frequency) analogously to the user-entered query which was never used.

As such, without wishing to be bound to any specific theory, if at least one replacement candidate query is associated with the acceptable values of the approximation hypothesis characteristics (e.g., at least one replacement candidate query is sufficiently similar to the user-entered query and is similarly rarely used or, in other words, at least one replacement candidate query is comparatively infrequently used and is sufficiently similar to the user-entered query), the hypothesis is that if the user-entered query would have been previously used by the search engine, past data of the user-entered query should have been similar to the past data of the at least one replacement candidate query so selected and, thus, this at least one replacement candidate query can be used as the approximated query for the user-entered query. In other words, this allows, in a sense, to infer that the past-query-specific data and the past-query-interdependence data of the approximated query are acceptable estimations of the past-query-specific data and of the past-query-interdependence data, respectively, of the user-entered query.

Thus, in some embodiments of the present technology, the server 230 may be configured to estimate the past-query-specific data that could have been associated with the user-entered query if the user-entered query had been previously submitted or otherwise previously used by the search engine of the server 230.

Also, in some embodiments of the present technology, the server 230 may be configured to estimate the past-query-interdependence data that could have been associated with the user-entered query if the user-entered query had been previously submitted or otherwise previously used by the search engine of the server 230. This means that the server 230 may be configured to estimate past transitions between the user-entered query and each one of the set of replacement candidate queries 350 that could have been recorded if past transitions between the user-entered query and each one of the set of replacement candidate queries 350 were previously performed by users of the search engine of the server 230.

As previously alluded to, the server 230 may be configured to select the approximated query from the set of replacement candidate queries 350 based on the string similarity between the user-entered query and each one of the set of replacement candidate queries 350 and the usage frequency of each one of the set of replacement candidate queries 350 (i.e., the approximation hypothesis characteristics).

Two different scenarios will now be described with respect to the selection of the approximated query from the set of replacement candidate queries 350 by the server 230 as well as their respective implementations within the scope of the present technology. Briefly, the first scenario related to when the server 230 selects only one, single replacement candidate query as the approximated query and the second scenario relates to when the server 230 selects more than one replacement candidate queries as more than one approximated queries.

Scenario 1: Server Selects a Single Replacement Candidate Query as the Approximated Query With reference to FIG. 4, there is depicted a graphical representation 400 of a graph that maps (i) respective string similarities of each one of the set of replacement candidate queries 350 and the user-entered query and of (ii) respective usage frequencies of each one of the set of replacement candidate queries 350. The graphical representation 400 of the graph is defined by a usage frequency axis 402 and a string similarity axis 404.

Also, there is depicted a usage frequency threshold line 406 which coincides with a usage frequency threshold value 407 of the approximation hypothesis characteristic of the usage frequency. In other words, all usage frequency values that are equal or lower to the usage frequency threshold value 407 are determined to be acceptable usage frequency values of the approximation hypothesis characteristic of the usage frequency.

The usage frequency threshold value 407 of the approximation hypothesis characteristic of the usage frequency can be determined by the server 230 in many different ways. The usage frequency threshold value 407 may be determined by the server 230 so that it coincides with a lower quartile (i.e., lowest 25% quantile) of the set of replacement candidate queries 350 according to a distribution of their usage frequencies. Alternatively, the usage frequency threshold value 407 may be determined empirically by the server 230 according to trial-and-error analyses. Optionally, the usage frequency threshold value 407 may be predetermined by the operator of the search engine or of the server 230.

Moreover, there is depicted a string similarity threshold line 408 which coincides with a string similarity threshold value 409 of the approximation hypothesis characteristic of the usage frequency. In other words, all string similarity values that are equal or lower to the string similarity threshold value 409 are determined to be acceptable string similarity values of the approximation hypothesis characteristic of the string similarity.

The string similarity threshold line 408 of the approximation hypothesis characteristic of the string similarity can be determined by the server 230 in many different ways. The string similarity threshold line 408 may be determined by the server 230 so that it coincides with a lower quartile (i.e., lowest 25% quantile) of the set of replacement candidate queries 350 according to a distribution of their edit distances (from the user-entered query). Alternatively, the string similarity threshold line 408 may be determined empirically by the server 230 according to trial-and-error analyses. Optionally, the string similarity threshold line 408 may be predetermined by the operator of the search engine or of the server 230.

Furthermore, there is depicted an acceptable approximation hypothesis region 410 which is bound by the string similarity axis 404, the usage frequency axis 402, the usage frequency threshold line 406 and the string similarity threshold line 408. In accordance with embodiments of the present technology, if a given replacement candidate query is mapped within the acceptable approximation hypothesis region 410 based on its associated string similarity to the user-entered query and based on its usage frequency, the given replacement candidate query is selected as the approximated query that can be used by the server 230 for approximating the past-query-specific data and the past-query-interdependence data of the user-entered query.

Indeed, if the given replacement candidate query is mapped within the acceptable approximation hypothesis region 410, the given replacement candidate query is associated with acceptable values of the approximation hypothesis characteristics, namely with a given acceptable usage frequency value of the approximation hypothesis characteristic of the usage frequency and with a given acceptable string similarity value of the approximation hypothesis characteristic of the string similarity.

There are also depicted four graphical markers 452, 454, 456 and 458. Let it be assumed that the graphical markers 452, 454, 456 and 458 are mapped based on the respective usage frequency of the replacement candidate queries 352, 354, 356 and 358, respectively, and based on the respective edit distances between the user-entered query and each one of the replacement candidate queries 352, 354, 356 and 358, respectively.

In other words, the graphical markers 452, 454, 456 and 458 are respectively representative of each one of the set replacement candidate queries 350, namely of the replacement candidate queries 352, 354, 356 and 358, having been mapped based on their respective usage frequencies and their respective edit distances from the user-entered query.

Figure 4:
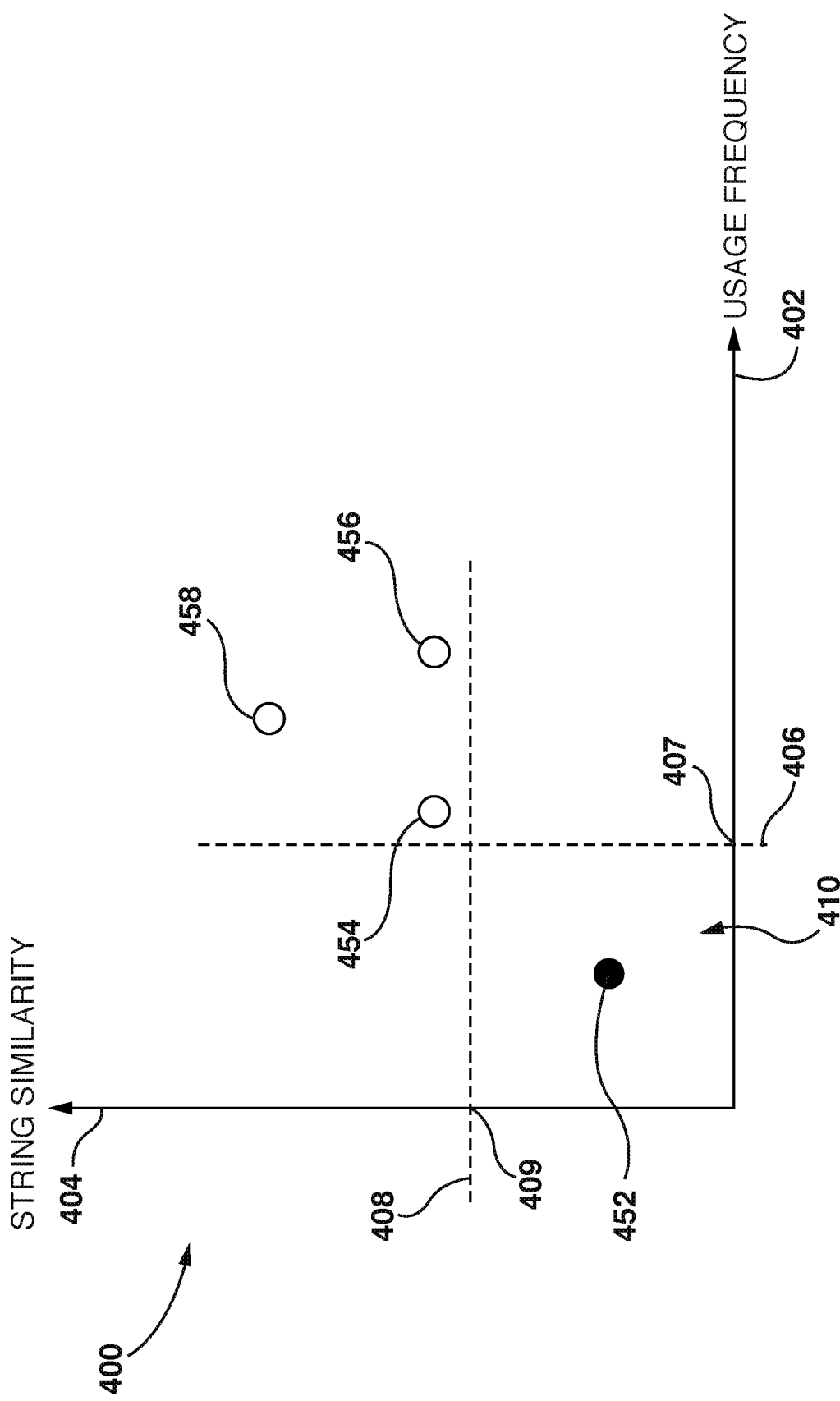
FIG. 4 depicts a schematic graphical representation with an acceptable approximation hypothesis region for selecting an approximated query amongst a set of replacement candidate queries which were selected from the past queries of FIG. 3 according to a first scenario and to some implementations of the present technology.

In this first scenario, as seen in FIG. 4, only the graphical marker 452, which is associated with the replacement candidate query 352, is mapped within the acceptable approximation hypothesis region 410. As such, the approximated query that is associated with the acceptable values of approximation hypothesis characteristics is the replacement candidate query 352.

It should be noted that approximated queries refer to all replacement candidate queries of the set of replacement candidate queries 350 which are associated with respective markers that are mapped within the acceptable approximation hypothesis region 410. As such, in this first scenario, the approximated query is a single replacement candidate query which is the replacement candidate query 352. Hence, the server 230 may be configured to use the replacement candidate query 352 as the approximation of the user-entered query.

This means that server 230 may be configured to estimate the past-query-specific data that could have been associated with the user-entered query based on the past-query-specific data of the replacement candidate query 352.

Also, the server 230 may be configured to estimate the past-query-interdependence data that could have been associated with the user-entered query based on the past-query-interdependence data of the replacement candidate query 352. This means that the server 230 may be configured to estimate past transitions between the user-entered query and each one of the set of replacement candidate queries 350 based on the past transitions between the replacement candidate query 352 and each one of the set of replacement candidate queries 350.

The server 230 may be configured to generate a respective feature vector for each pair consisting of the approximated query (i.e., the replacement candidate query 352) and a given one of the set of replacement candidate queries 350. The generation of feature vectors according to this first scenario will now be described with reference to FIG. 5.

Figure 5:
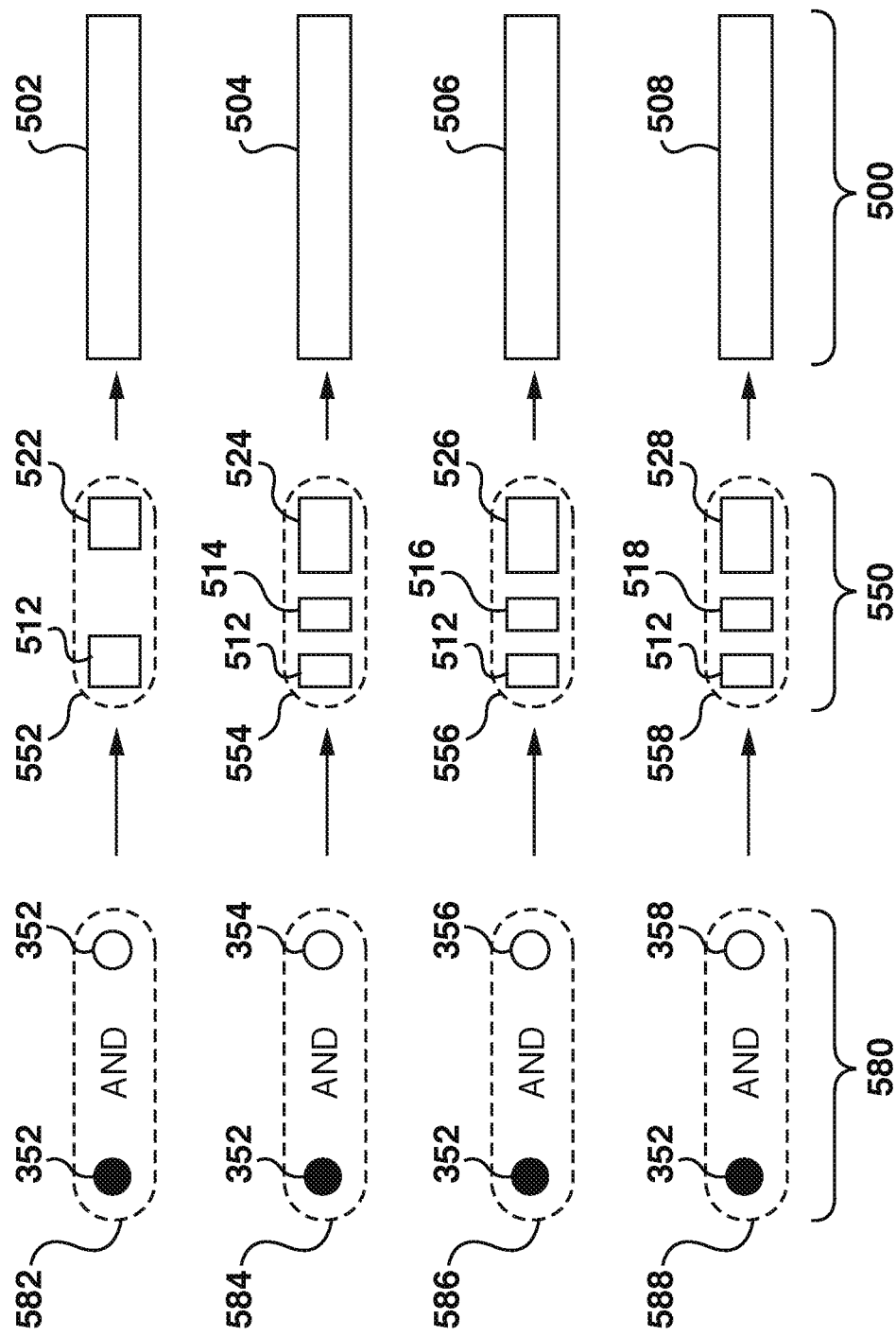
FIG. 5 schematically depicts a plurality of pairs of queries and respectively generated feature vectors according to the first scenario and to some implementations of the present technology.

In FIG. 5, there is depicted a plurality of pairs 580, a plurality of feature datasets 550 and a plurality of feature vectors 500 generated by the server 230. The plurality of pairs 580 comprises pairs consisting of the approximated query (i.e., the replacement candidate query 352) and a given one of the set of replacement candidate queries 350.

As an illustrative example depicted in FIG. 5, the plurality of pairs 580 comprises:
- a first pair 582 consisting of (i) the replacement candidate query 352 "oligophsony" (i.e., the approximated query) which is a first query within the first pair 582 and (ii) the replacement candidate query 352 "oligophsony" which is a second query within the first pair 582;
- a second pair 584 consisting of (i) the replacement candidate query 352 "oligophsony" (i.e., the approximated query) which is a first query within the second pair 584 and (ii) the replacement candidate query 354 "oligospoony" which is a second query within the second pair 584;
- a third pair 586 consisting of (i) the replacement candidate query 352 "oligophsony" (i.e., the approximated query) which is a first query within the third pair 586 and (ii) the replacement candidate query 356 "oligopoly" which is a second query within the third pair 586; and
- a fourth pair 588 consisting of (i) the replacement candidate query 352 "oligophsony" (i.e., the approximated query) which is a first query within the fourth pair 588 and (ii) the replacement candidate query 358 "oligophrenia" which is a second query within the fourth pair 588.

The server 230 may be configured to determine for each one of the plurality of pairs 580 a respective feature dataset of the plurality of feature datasets 550. As such, the server 230 may be configured to determine: for the first pair 582 a first feature dataset 552; for the second pair 584 a second feature dataset 554; for the third pair 586 a third feature dataset 556; and for the fourth pair 588 a fourth feature dataset 558.

Each one of the plurality of feature datasets 550 may be determined by the server 230 based on each one of the respective pair of queries and their respectively associated information stored in the lexicon database 275 and in the query log database 270.

For example, the server 230 may determine the first feature dataset 552 by retrieving information from the lexicon database 275 and from the query log database 270 that is associated with each query within the first pair 582

(i.e., the replacement candidate query 352). As such, the first feature dataset 552 may comprise an indication 522 of the past-query-interdependence data indicative of past transitions between the replacement candidate query 352 (i.e., the approximated query) and the replacement candidate query 352. Additionally, the first feature dataset 552 may comprise an indication 512 of the past-query-specific data associated with the replacement candidate query 352. Furthermore, the server 230 may retrieve the surface-form similarity features, the phonetic-form similarity features, the entity features, the dictionary features and the frequency features associated with the replacement candidate query 352 from the lexicon database 275 and the query log database 270 and include them in the first feature dataset 552.

In another example, the server 230 may determine the third feature dataset 556 by retrieving information from the lexicon database 275 and from the query log database 270 that is associated with each query within the third pair 586 (i.e, the replacement candidate query 352 which is the approximated query and the replacement candidate query 356). As such, the third feature dataset 556 may comprise an indication 524 of the past-query-interdependence data indicative of past transitions between the replacement candidate query 352 (i.e., the approximated query) and the replacement candidate query 356. Additionally, the third feature dataset 556 may comprise an indication 512 of the past-query-specific data associated with the replacement candidate query 352 (i.e., the approximated query) and an indication 516 of the past-query-specific data associated with the replacement candidate query 356. Furthermore, the server 230 may retrieve the surface-form similarity features, the phonetic-form similarity features, the entity features, the dictionary features and the frequency features associated with the replacement candidate query 352 and the replacement candidate query 356 from the lexicon database 275 and the query log database 275 and include them in the third feature dataset 556.

In some embodiments of the present technology, the server 230 may be configured to store the plurality of feature datasets 550 in the query log database 270 and/or the solid state drive 120 of the server 230.

The server 230 may be configured to generate a respective feature vector of the plurality of feature vectors 500 based on a respective so-determined feature dataset of the plurality of feature datasets 550. As a result, since each respective feature dataset comprises a respective indication of the past-query-interdependence data, a respective feature vector generated based thereon is representative of the past transitions between (i) the first query from a respective pair (i.e., the approximated query) and (ii) the second query from the respective pair (i.e., a respective given one of the set of replacement candidate queries 350).

Continuing with the illustration of FIG. 5, the plurality of feature vectors 500 comprises:
  a first feature vector 502 being representative of the past transitions between the replacement candidate query 352 "oligophsony" (i.e., the approximated query) and the replacement candidate query 352 "oligophsony";
  a second feature vector 504 being representative of the past transitions between the replacement candidate query 352 "oligophsony" (i.e., the approximated query) and the replacement candidate query 354 "oligospoony";
  a third feature vector 506 being representative of the past transitions between the replacement candidate query 352 "oligophsony" (i.e., the approximated query) and the replacement candidate query 356 "oligopoly"; and
  a fourth feature vector 508 being representative of the past transitions between the replacement candidate query 352 "oligophsony" (i.e., the approximated query) and the replacement candidate query 358 "oligophrenia".

Each feature vector of the plurality of feature vectors 500 is also representative of the past-query-specific data associated with each query within the respective pair of the plurality of pairs 580. For example, the first feature vector 502 may also be representative of the past-query-specific data associated with the replacement candidate query 352 (i.e., the approximated query). In another example, the third feature vector 506 may also be representative of (i) the past-query-specific data associated with the replacement candidate query 352 (i.e., the approximated query) and (ii) the past-query-specific data associated with the replacement candidate query 356.

It is contemplated that, in some embodiments of the present technology, a respective feature vector of the plurality of feature vectors 500 may be representative of the surface-form similarity features, the phonetic-form similarity features, the entity features, the dictionary features and the frequency features of the respective pair of queries of the plurality of pairs 580. Indeed, a respective feature vector of the plurality of feature vectors 500 may be representative of the surface-form similarity features, the phonetic-form similarity features, the entity features, the dictionary features and the frequency features since they can be included in respective generation datasets as previously mentioned.

In some embodiments of the present technology, the server 230 may be configured to store the plurality of pairs 580 in association with the plurality of feature vectors 500. Put another way, the server 230 may be configured to store each pair of the plurality of pairs 580 in association with a respective feature vector of the plurality of feature vectors 500. The server 230 may be configured to store the plurality of pairs 580 in association with the plurality of feature vectors 500 in the query log database 270 and/or in the solid state drive 120 of the server 230.

In this first scenario, since the approximated query is a single replacement candidate query (i.e., the replacement candidate query 352), the server 230 may be configured to determine that the replacement candidate query 352 (i.e., the approximated query) is the only acceptable approximation for the user-entered query. As a result, the server 230 may be configured to use the plurality of feature vectors 500 for the replacement candidate query 352 (i.e., the approximated query) as a plurality of approximated feature vectors for the user-entered query. In other words, the server 230 may be configured to use a given feature vector of the plurality of feature vectors 500 as a given approximated feature vector, which is representative of estimated past transitions between the user-entered query and the second query of the respective pair.

Continuing with the illustration of FIG. 5, the server 230 may be configured to use:
  the first feature vector 502 being representative of the past transitions between the replacement candidate query 352 "oligophsony" (i.e., the approximated query) and the replacement candidate query 352 "oligophsony" as a first approximated feature vector being representative of the estimated past transitions between the user-entered query "oligopsony" and the replacement candidate query 352 "oligophsony";
  a second feature vector 504 being representative of the past transitions between the replacement candidate query 352 "oligophsony" (i.e., the approximated query) and the replacement candidate query 354 "oligospoony" as a second approximated feature vector being representative of the estimated past transitions between the user-entered query "oligopsony" and the replacement candidate query 354 "oligospoony";

a third feature vector 506 being representative of the past transitions between the replacement candidate query 352 "oligophsony" (i.e., the approximated query) and the replacement candidate query 356 "oligopoly" as a third approximated feature vector being representative of the estimated past transitions between the user-entered query "oligopsony" and the replacement candidate query 356 "oligopoly"; and a fourth feature vector 508 being representative of the past transitions between the replacement candidate query 352 "oligophsony" (i.e., the approximated query) and the replacement candidate query 358 "oligophrenia" as a fourth approximated feature vector being representative of the estimated past transitions between the user-entered query "oligopsony" and the replacement candidate query 358 "oligophrenia".

Now that the server 230 is configured to use the plurality of feature vectors 500 as a plurality of approximated feature vectors where a respective approximated feature vector is representative of the estimated past transitions between the user-entered query and a respective one of the set of replacement candidate queries 350, the server 230 may be configured to generate a respective ranking parameter for each approximated feature vector.

In some embodiments of the present technology, the server 230 may be configured to generate a respective ranking parameter for each approximated feature vector by using a ranking system. The ranking system may be a machine learned algorithm (MLA) that was trained based on training feature vectors generated for different pairs of past queries of the plurality of past queries 300. The training feature vectors may be generated in a similar manner to how the plurality of feature vectors 500 is generated by the server 230. This trained MLA may be implemented and trained by the server 230.

It is noted, however, that the ranking system may be implemented as any software-type ranker that is configured to generate respective ranking parameters for feature vectors, which were similarly generated to the plurality of feature vectors 500. Thus, it can be said that the ranking system may be implemented as any software-type ranker that is configured to rank feature vectors.

As an example, the ranking system may be a linear ranker which generates a given real value, being a given ranking parameter, for a given feature vector t. For example, the linear ranker may generate the given ranking parameter for the given feature vector by using a learned weight vector that was optimized for accuracy based on human-labelled query pairs. Hence, in some implementations of the present technology, it is contemplated that the ranking system may be a supervised MLA that was trained based on human-labelled query pairs for which training feature vectors have been generated by the server 230 similarly to how the plurality of feature vectors 500 is generated.

One example of the ranking system that can be used in some implementations of the present technology is described in US patent application entitled "QUERY CORRECTION PROBABILITY BASED ON QUERY-CORRECTION PAIRS", application Ser. No. 12/790,996 filed on Jun. 1, 2011, the entirety of which is incorporated herein by reference. However, it is contemplated that other ranking systems may be used for generating respective ranking parameters for approximated feature vectors, without departing from the scope of the present technology.

In some embodiments of the present technology, the server 230 may be configured to determine a most highly ranked approximated feature vector amongst the plurality of approximated feature vectors based on the respectively associated ranking parameters. It should be noted that each ranking parameter is indicative of a probability of the second query of each respective pair of the plurality of pairs 580 to be the replacement query for the user-entered query. Therefore, the server 230 may be configured to determine the replacement query for the user-entered query amongst the set of replacement candidate queries 350 based on the respective ranking parameters associated with the plurality of approximated feature vectors (i.e., respectively used feature vector amongst the plurality of feature vectors 500).

For example, let's assume that the third approximated feature vector (i.e., the third feature vector 506 being representative of the past transitions between the replacement candidate query 352 "oligophsony" (i.e., the approximated query) and the replacement candidate query 356 "oligopoly") being representative of the estimated past transitions between the user-entered query "oligopsony" and the replacement candidate query 356 "oligopoly" is associated with the highest ranking parameter amongst the ranking parameters computed for each of the approximated feature vectors (i.e., the first approximated feature vector being the first feature vector 502, the second approximated feature vector being the second feature vector 504, the third approximated feature vector being the third feature vector 506 and the fourth approximated feature vector being the fourth feature vector 508). As such, the server 230 may be configured to determine that the replacement query for the user-entered query "oligopsony" is "oligopoly".

As previously mentioned, the server 230 may be configured to generate and transmit to the electronic device 210 the response data packet 290 via the communications network 240 (see FIG. 2). The response data packet 290 may comprise information indicative of the replacement query "oligopoly" for the user-entered query "oligopsony". The electronic device 210 may be configured to acquire the response data packet 290 and may display via the display 150 the replacement query to the user 211 in the browser application 250.

Alternatively, the server 230 may be configured to include in the response data packet 290 search results that are responsive to the replacement query in addition to or instead of search results that are responsive to the user-entered query.

Scenario 2: Server Selects More than One Replacement Candidate Queries as More than One Approximated Queries With reference to FIG. 6, similarly to the first scenario, there is depicted a graphical representation 600 of a graph that maps respective string similarities of each one of the set of replacement candidate queries 350 and the user-entered query and of respective usage frequencies of each one of the set of replacement candidate queries 350. Similarly to the graphical representation 400 of FIG. 4 (i.e., the first scenario), the graphical representation 600 of the graph is defined by the usage frequency axis 402 and the string similarity axis 404.

Figure 6:
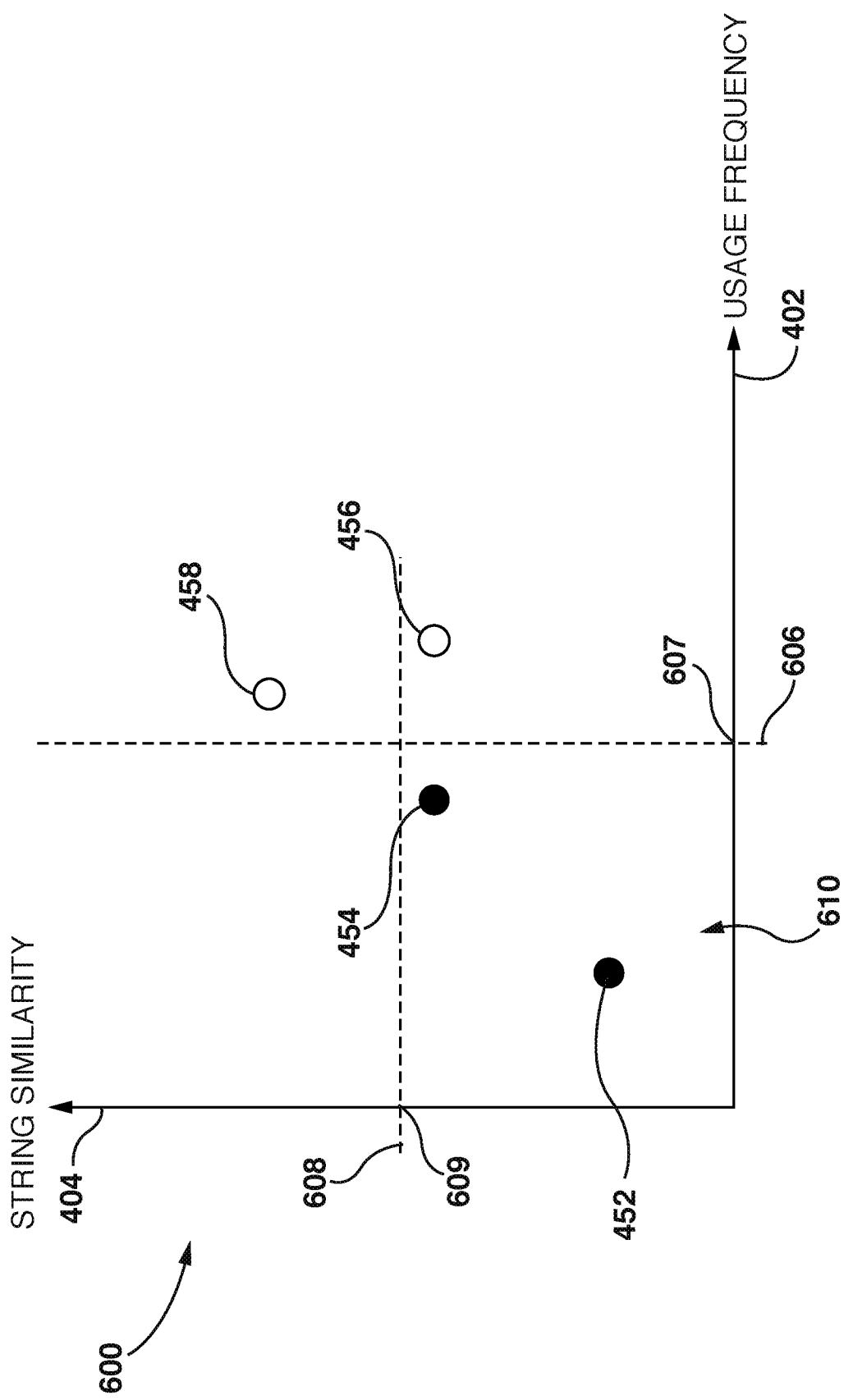
FIG. 6 depicts a schematic graphical representation with an acceptable approximation hypothesis region for selecting more than one approximated query amongst a set of replacement candidate queries which were selected from the past queries of FIG. 3 according to a second scenario and to some implementations of the present technology.

Similarly to the graphical representation 400, the four graphical markers 452, 454, 456 and 458 are also depicted in FIG. 6. As previously mentioned, the graphical markers 452, 454, 456 and 458 are mapped based on the respective usage frequency of the replacement candidate queries 352, 354, 356 and 358, respectively, and based on the respective edit distances between the user-entered query and each one of the replacement candidate queries 352, 354, 356 and 358, respectively.

Similarly to the graphical representation 400, this means that the graphical markers 452, 454, 456 and 458 are respectively representative of each one of the set of replacement candidate queries 350, namely of the replacement candidate queries 352, 354, 356 and 358, having been mapped based on their respective usage frequencies and their respective edit distances from the user-entered query.

However, instead of depicting the usage frequency threshold line 406 which coincides with the usage frequency threshold value 407 of the approximation hypothesis characteristic of the usage frequency, in this second scenario unlike the first scenario, there is depicted a usage frequency threshold line 606 which coincides with a usage frequency threshold value 607 of the approximation hypothesis characteristic of the usage frequency. In this case, let it be assumed that the usage frequency threshold value 607 is determined by the server 230 such that it is superior to the usage frequency threshold value 407.

Also, instead of depicting the string similarity threshold line 408 which coincides with the string similarity threshold value 409 of the approximation hypothesis characteristic of the usage frequency, in this second scenario unlike the first scenario, there is depicted a string similarity threshold line 608 which coincides with a string similarity threshold value 609 of the approximation hypothesis characteristic of the usage frequency. In this case, let it be assumed that the string similarity threshold value 609 is determined by the server 230 such that it is superior to the string similarity threshold value 409.

As a result, instead of the acceptable approximation hypothesis region 410 which is bound by the string similarity axis 404, the usage frequency axis 402, the usage frequency threshold line 406 and the string similarity threshold line 408, in this second scenario unlike the first scenario, there is depicted an acceptable approximation hypothesis region 610 which is bounded by the string similarity axis 404, the usage frequency axis 402, the usage frequency threshold line 606 and the string similarity threshold line 608.

Due to the string similarity threshold value 609 being superior to the string similarity value 409 and to the usage frequency threshold value 607 being superior to the usage frequency threshold value 407, the acceptable approximation hypothesis region 610 occupies a larger surface on the graphical representation 600 of the graph than the acceptable approximation hypothesis region 410 on the graphical representation 400 of the graph.

In this second scenario, as seen in FIG. 6, the graphical markers 452 and 454, which are associated with the replacement candidate queries 352 and 354, respectively, are mapped within the acceptable approximation hypothesis region 610. As such, the at least one replacement candidate query that is associated with the acceptable values of approximation hypothesis characteristics is more than one, expressly in this case two, replacement candidate queries 352 and 354. In other words, the server 230 may be configured to select more than one approximated queries which are the replacement candidate queries 352 and 354.

It should be noted that the approximated queries refer to all replacement candidate queries of the set of replacement candidate queries 350 which are associated with respective markers that are mapped within the acceptable approximation hypothesis region 610. As such, in this second scenario, instead of a single approximated query there are more than one approximated queries which are the replacement candidate queries 352 and 354. Hence, the server 230 may be configured to use the replacement candidate queries 352 and 354 for approximating information regarding the user-entered query.

In this second scenario, since there is more than one approximated queries (i.e., the replacement candidate queries 352 and 354), the server 230 determines that the replacement candidate queries 352 and 354 are both acceptable approximations for the user-entered query. However, the server 230 may not be able to determine which one amongst the replacement candidate queries 352 and 354 is a better approximation for the user-entered query. As a result, instead of determining the best approximation (e.g., the better approximated query amongst the more than one approximated queries) for the user-entered query amongst the replacement candidate queries 352 and 354, the server 230 may be configured to use information regarding both the replacement candidate queries 352 and 354 in order to approximate the information regarding the user-entered query.

This means that server 230 may be configured to estimate the past-query-specific data that could have been associated with the user-entered query based on the past-query-specific data of the replacement candidate queries 352 and 354, respectively.

Also, the server 230 may be configured to estimate the past-query-interdependence data that could have been associated with the user-entered query based on the past-query-interdependence data of the replacement candidate queries 352 and 354, respectively. This means that the server 230 may be configured to estimate past transitions between the user-entered query and each one of the set of replacement candidate queries 350 based on (i) the past transitions between the replacement candidate query 352 (i.e., a first one of the more than one approximated queries) and each one of the set of replacement candidate queries 350 and (ii) the past transitions between the replacement candidate query 354 (i.e., a second one of the more than one approximated queries) and each one of the set of replacement candidate queries 350.

The server 230 may be configured to compute a respective feature vector for each pair consisting of a given one of the more than one approximated queries and a given one of the set of replacement candidate queries 350. This means that since in this second scenario, there are more than one approximated queries (replacement candidate queries 352 and 354), the server 230 is configured to compute a respective feature vector for: (i) each pair consisting of the replacement candidate query 352 (i.e., the first one of the more than one approximated queries) and a given one of the set of replacement candidate queries 350 (i.e., similarly to the first scenario) and (ii) each pair consisting of the replacement candidate query 354 (i.e., the second one of the more than one approximated queries) and a given one of the set of replacement candidate queries 350.

Figure 7:
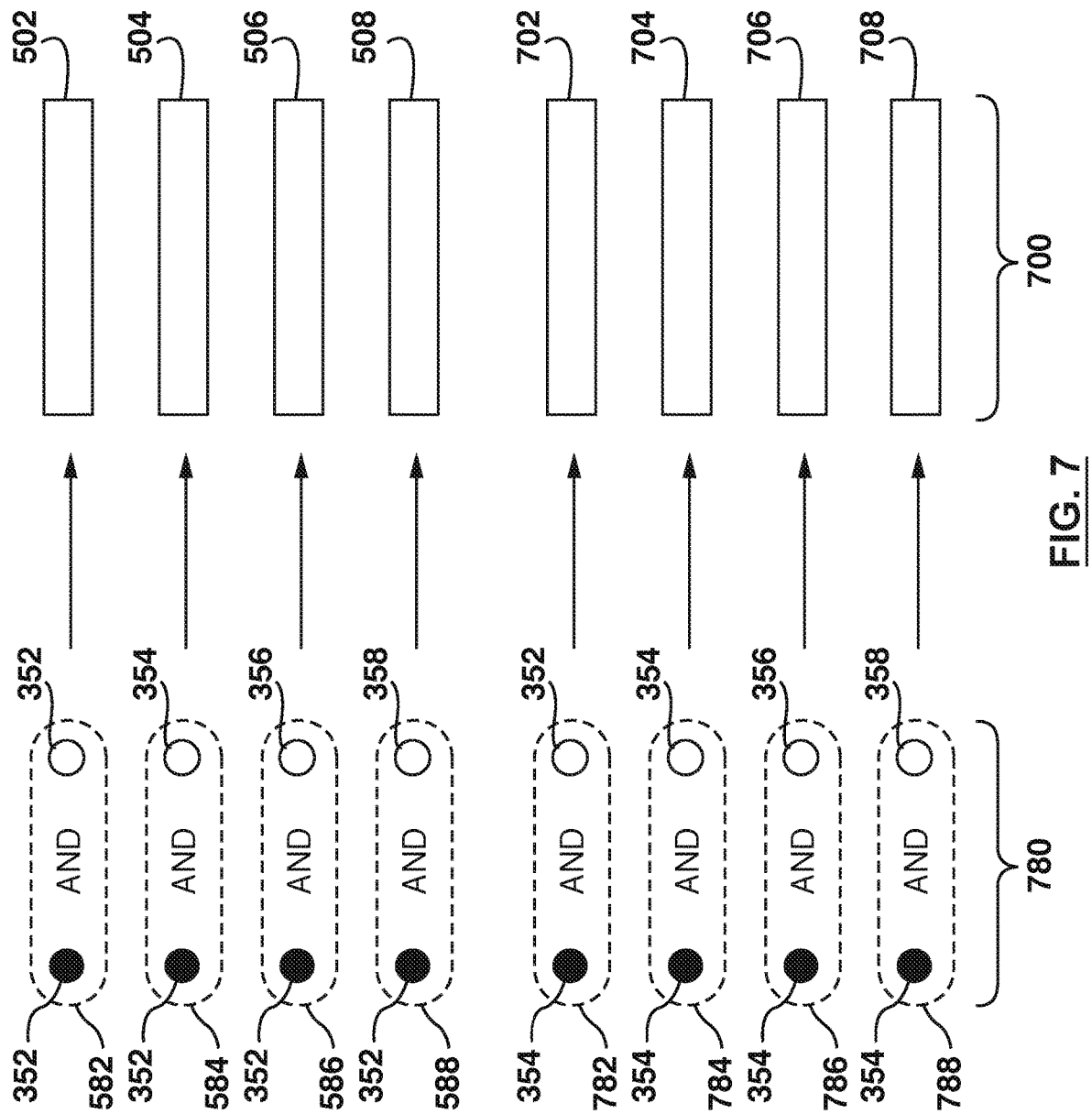
FIG. 7 schematically depicts a plurality of pairs of queries and respectively generated feature vectors according to the second scenario and to some implementations of the present technology.

With reference to FIG. 7, there is depicted a plurality of feature vectors 700. The server 230 generated a respective feature vector of the plurality of feature vectors for (i) each pair consisting of the replacement candidate query 352 (i.e., the first one of the more than one approximated queries) and a given one of the set of replacement candidate queries 350 (i.e., similarly to the first scenario) and (ii) each pair consisting of the replacement candidate query 354 (i.e., the second one of the more than one approximated queries) and a given one of the set of replacement candidate queries 350. In other words, for each pair of a plurality of pairs 780, the server 230 may be configured to generate a respective feature vector of the plurality of feature vectors 700.

For illustration purposes only, the plurality of pairs 780 comprises:
- the first pair 582 consisting of (i) the replacement candidate query 352 "oligophsony" (i.e., the first one of the more than one approximated queries) which is the first query within the first pair 582 and (ii) the replacement candidate query 352 "oligophsony" which is the second query within the first pair 582;
- the second pair 584 consisting of (i) the replacement candidate query 352 "oligophsony" (i.e., the first one of the more than one approximated queries) which is the first query within the second pair 584 and (ii) the replacement candidate query 354 "oligospoony" which is the second query within the second pair 584;
- the third pair 586 consisting of (i) the replacement candidate query 352 "oligophsony" (i.e., the first one of the more than one approximated queries) which is the first query within the third pair 586 and (ii) the replacement candidate query 356 "oligopoly" which is the second query within the third pair 586;
- the fourth pair 588 consisting of (i) the replacement candidate query 352 "oligophsony" (i.e., the first one of the more than one approximated queries) which is the first query within the fourth pair 588 and (ii) the replacement candidate query 358 "oligophrenia" which is the second query within the fourth pair 588;
- a fifth pair 782 consisting of (i) the replacement candidate query 354 "oligospoony" (i.e., the second one of the more than one approximated queries) which is a first query within the fifth pair 782 and (ii) the replacement candidate query 352 "oligophsony" which is a second query within the fifth pair 782;
- a sixth pair 784 consisting of (i) the replacement candidate query 354 "oligospoony" (i.e., the second one of the more than one approximated queries) which is a first query within the sixth pair 784 and (ii) the replacement candidate query 354 "oligospoony" which is a second query within the sixth pair 784;
- a seventh pair 786 consisting of (i) the replacement candidate query 354 "oligospoony" (i.e., the second one of the more than one approximated queries) which is a first query within the seventh pair 786 and (ii) the replacement candidate query 356 "oligopoly" which is a second query within the seventh pair 786; and
- an eighth pair 788 consisting of (i) the replacement candidate query 354 "oligospoony" (i.e., the second one of the more than one approximated queries) which is a first query within the eighth pair 788 and (ii) the replacement candidate query 358 "oligophrenia" which is a second query within the eighth pair 788.

For the sake of simplicity only, unlike in FIG. 5 where the plurality of feature datasets 550 was depicted, the respective feature datasets determined by the server 230 for generating the plurality of feature vectors 700 are omitted. Nevertheless, it should be understood that the server 230 may be configured to determine a respective feature dataset for each one of a plurality of pairs 780 in order to generate a respective feature vector of the plurality of feature vectors 700 in a similar manner to what was described in the first scenario.

In some embodiments of the present technology, at least some of the plurality of feature vectors 700 may have been already computed and stored by the server 230. For example, if the server 230 is tasked with computing a given feature vector for a given pair of queries, the server 230 may be configured to search within its solid state drive 120 and/or the query log database 270 for an indication of that given pair of queries and the respectively associated given feature vector. As such, the server 230 may be configured to simply retrieve the given feature vector, instead of regenerating the given feature vector.

In some embodiments of the present technology, the server 230 may be configured to store the plurality of pairs 780 in association with the plurality of feature vectors 700. Put another way, the server 230 may be configured to store each pair of the plurality of pairs 780 in association with a respective vector of the plurality of feature vectors 700. The server 230 may be configured to store the plurality of pairs 780 in association with the plurality of feature vectors 700 in the query log database 270 and/or in the solid state drive 120 of the server 230.

The generation of each one of the plurality of feature vectors 700 may be executable by the server 230 similarly to how the server 230 is configured to generate each one of the plurality of feature vectors 500 in the first scenario.

As such, for illustration purposes only, the plurality of feature vectors 500 comprises:
- the first feature vector 502 being representative of the past transitions between the replacement candidate query 352 "oligophsony" (i.e., the first one of the more than one approximated queries) and the replacement candidate query 352 "oligophsony";
- the second feature vector 504 being representative of the past transitions between the replacement candidate query 352 "oligophsony" (i.e., the first one of the more than one approximated queries) and the replacement candidate query 354 "oligospoony";
- the third feature vector 506 being representative of the past transitions between the replacement candidate query 352 "oligophsony" (i.e., the first one of the more than one approximated queries) and the replacement candidate query 356 "oligopoly";
- the fourth feature vector 508 being representative of the past transitions between the replacement candidate query 352 "oligophsony" (i.e., the first one of the more than one approximated queries) and the replacement candidate query 358 "oligophrenia";
- a fifth feature vector 702 being representative of the past transitions between the replacement candidate query 354 "oligospoony" (i.e., the second one of the more than one approximated queries) and the replacement candidate query 352 "oligophsony";
- a sixth feature vector 704 being representative of the past transitions between the replacement candidate query 354 "oligospoony" (i.e., the second one of the more than one approximated queries) and the replacement candidate query 354 "oligospoony";
- a seventh feature vector 706 being representative of the past transitions between the replacement candidate query 354 "oligospoony" (i.e., the second one of the more than one approximated queries) and the replacement candidate query 356 "oligopoly"; and
- an eighth feature vector 708 being representative of the past transitions between the replacement candidate query 354 "oligospoony" (i.e., the second one of the more than one approximated queries) and the replacement candidate query 358 "oligophrenia".

As previously mentioned, in this second scenario, since there are more than one approximated queries (i.e., the replacement candidate queries 352 and 354), the server 230 determines that the replacement candidate queries 352 and 354 are both acceptable approximations for the user-entered query. However, the server 230 may not be able to determine which one amongst the replacement candidate queries 352 and 354 is a better approximation for the user-entered query. As a result, instead of determining the better approximation (the better one amongst the more than one approximated queries) for the user-entered query amongst the replacement candidate queries 352 and 354, the server 230 may be configured to use information associated with both the replacement candidate queries 352 and 354 in order to approximate information regarding the user-entered query.

To that end, the server 230 may be configured to consolidate more than one feature vectors being representative of the past transitions between each of the more than one approximated queries and the respective given one of the set of replacement candidate queries 350 into a respective consolidated feature vector.

Figure 8:
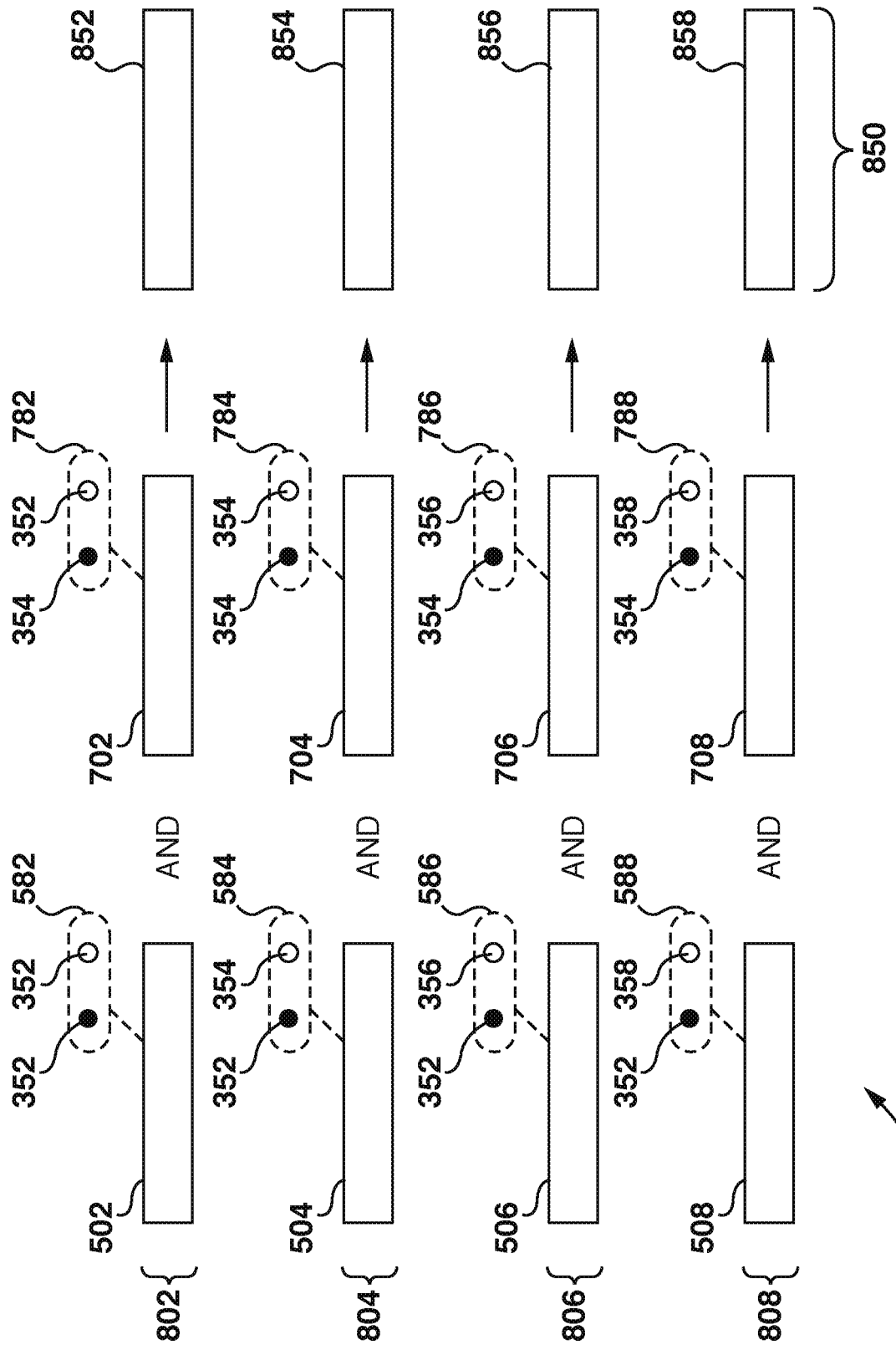
FIG. 8 schematically depicts a consolidation procedure of a plurality of feature vectors of FIG. 7 according to the second scenario and to some implementations of the present technology.

With reference to FIG. 8, there is depicted a consolidation procedure 800 of the plurality of feature vectors 700. The server 230 may be configured to consolidate:
- a first totality 802 of feature vectors which are representative of the past transitions between (i) the replacement candidate query 352 (i.e., the first one of the more than one approximated queries) and the replacement candidate query 352 (i.e., the first feature vector 502) and between (ii) the replacement candidate query 354 (i.e., the second one of the more than one approximated queries) and the replacement candidate query 352 (i.e., the fifth feature vector 702);
- a second totality 804 of feature vectors which are representative of the past transitions between (i) the replacement candidate query 352 (i.e., the first one of the more than one approximated queries) and the replacement candidate query 354 (i.e., the second feature vector 504) and between (ii) the replacement candidate query 354 (i.e., the second one of the more than one approximated queries) and the replacement candidate query 354 (i.e., the sixth feature vector 704);
- a third totality 806 of feature vectors which are representative of the past transitions between (i) the replacement candidate query 352 (i.e., the first one of the more than one approximated queries) and the replacement candidate query 356 (i.e., the third feature vector 506) and between (ii) the replacement candidate query 354 (i.e., the second one of the more than one approximated queries) and the replacement candidate query 356 (i.e., the seventh feature vector 706); and
- a fourth totality 808 of feature vectors which are representative of the past transitions between (i) the replacement candidate query 352 (i.e., the first one of the more than one approximated queries) and the replacement candidate query 358 (i.e., the fourth feature vector 508) and between (ii) the replacement candidate query 354 (i.e., the second one of the more than one approximated queries) and the replacement candidate query 358 (i.e., the eighth feature vector 708).

This means that the server 230 may be configured to consolidate:
- the first feature vector 502 (associated with the first pair 582 consisting of the replacement candidate query 352 and the replacement candidate query 352) with the fifth feature vector 702 (associated with the fifth pair 782 consisting of the replacement candidate query 354 and the replacement candidate query 352);
- the second feature vector 504 (associated with the second pair 584 consisting of the replacement candidate query 352 and the replacement candidate query 354) with the sixth feature vector 704 (associated with the sixth pair 784 consisting of the replacement candidate query 354 and the replacement candidate query 354);
- the third feature vector 506 (associated with the third pair 586 consisting of the replacement candidate query 352 and the replacement candidate query 356) with the seventh feature vector 706 (associated with the seventh pair 786 consisting of the replacement candidate query 354 and the replacement candidate query 356); and
- the fourth feature vector 508 (associated with the fourth pair 588 consisting of the replacement candidate query 352 and the replacement candidate query 358) with the eighth feature vector 708 (associated with the eighth pair 788 consisting of the replacement candidate query 354 and the replacement candidate query 358).

The server 230 may be configured to consolidate:
- the first totality 802 of feature vectors into a first consolidated feature vector 852 of the plurality of consolidated feature vectors 850;
- the second totality 804 of feature vectors into a second consolidated feature vector 854 of the plurality of consolidated feature vectors 850;
- the third totality 806 of feature vectors into a third consolidated feature vector 856 of the plurality of consolidated feature vectors 850; and
- the fourth totality 808 of feature vectors into a fourth consolidated feature vector 858 of the plurality of consolidated feature vectors 850.

It should be noted that each one of the first, second, third and fourth totalities 802, 804, 806 and 808 of feature vectors, respectively, comprises more than one, namely two, feature vectors. However, in other embodiments of the present technology, each one of the first, second, third and fourth totalities 802, 804, 806 and 808 of feature vectors, respectively, may comprise a different number of feature vectors than two feature vectors, without departing from the scope of the present technology.

However, it is contemplated that a total number of feature vectors in each one of the totalities 802, 804, 806 and 808 of feature vectors is equal to a total number of approximated queries within the more than one approximated queries that are determined by the server 230.

The server 230 may be configured to consolidate each one of the totalities 802, 804, 806 and 808 of feature vectors in different ways. For example, the server 230 may be configured to mean each one of the totalities 802, 804, 806 and 808 of feature vectors for generating a respective consolidated feature vector of the plurality of consolidated feature vectors 850. This means that the server 230 may be configured to compute a mean vector for each one of the totalities 802, 804, 806 and 808 of feature vectors. In another example, the server 230 may be configured to average each one of the totalities 802, 804, 806 and 808 of feature vectors for generating a respective consolidated feature vector of the plurality of consolidated feature vectors 850. This means that the server 230 may be configured to compute an average vector for each one of the totalities 802, 804, 806 and 808 of feature vectors.

Irrespective of a specific way in which the server 230 may be configured to consolidate each one of the totalities 802, 804, 806 and 808 of feature vectors, each respective consolidated feature vector comprises information that is representative at least partially of information in a respective totality of feature vectors.

As a result of the execution of the consolidation procedure 800, the server 230 generates the plurality of consolidated feature vectors 850. The server 230 may be configured to use a respective consolidated feature vector of the plurality of consolidated feature vectors 850 as respective approximated feature vectors representative of estimated past transitions between the user-inputted query and the respective given one of the set of replacement candidate queries 350. In other words, each consolidated feature vector of the plurality of consolidated feature vectors 850 can be used as a respective approximated feature vector representative of estimated past transitions between the user-entered query and a respective given one of the set of replacement candidate queries 350.

As an illustration, within the plurality of consolidated feature vectors 850:
- the first consolidated feature vector 852 can be used as a first approximated feature vector which is representative of the estimated past transitions between the user-entered query and the replacement candidate query 352;
- the second consolidated feature vector 854 can be used as a second approximated feature vector which is representative of the estimated past transitions between the user-entered query and the replacement candidate query 354;
- the third consolidated feature vector 856 can be used as a third approximated feature vector which is representative of the estimated past transitions between the user-entered query and the replacement candidate query 356; and
- the fourth consolidated feature vector 858 can be used as a fourth approximated feature vector which is representative of the estimated past transitions between the user-entered query and the replacement candidate query 358.

In some embodiments of the present technology, the server 230 may be configured to generate a respective ranking parameter for each approximated feature vector of the plurality of approximated feature vectors by using the ranking system, similarly to how the server 230 generated the respective ranking parameter for each approximated feature vector in the first scenario.

For example, let it be assumed that the fourth approximated feature vector being representative of the estimated past transitions between the user-entered query "oligopsony" and the replacement candidate query 358 "oligophrenia" is associated with the highest ranking parameter amongst all ranking parameters computed for each one of the plurality of approximated feature vectors (e.g., the first approximated feature vector being the first consolidated feature vector 852, the second approximated feature vector being the second consolidated feature vector 854, the third approximated feature vector being the third consolidated feature vector 856 and the fourth approximated feature vector being the fourth consolidated feature vector 858). As such, the server 230 may be configured to determine that the replacement query for the user-entered query "oligopsony" is "oligophrenia".

The server 230 may be configured to generate and transmit the response data packet 290 to the electronic device 210. The response data packet 290, in this second scenario, may comprise information that is indicative of the replacement query "oligophrenia" for the user-entered query "oligopsony". Alternatively, the server 230 may include in the response data packet 290 search results that are responsive to the replacement query in addition or instead of search results that are responsive to the user-entered query.

Figure 9:
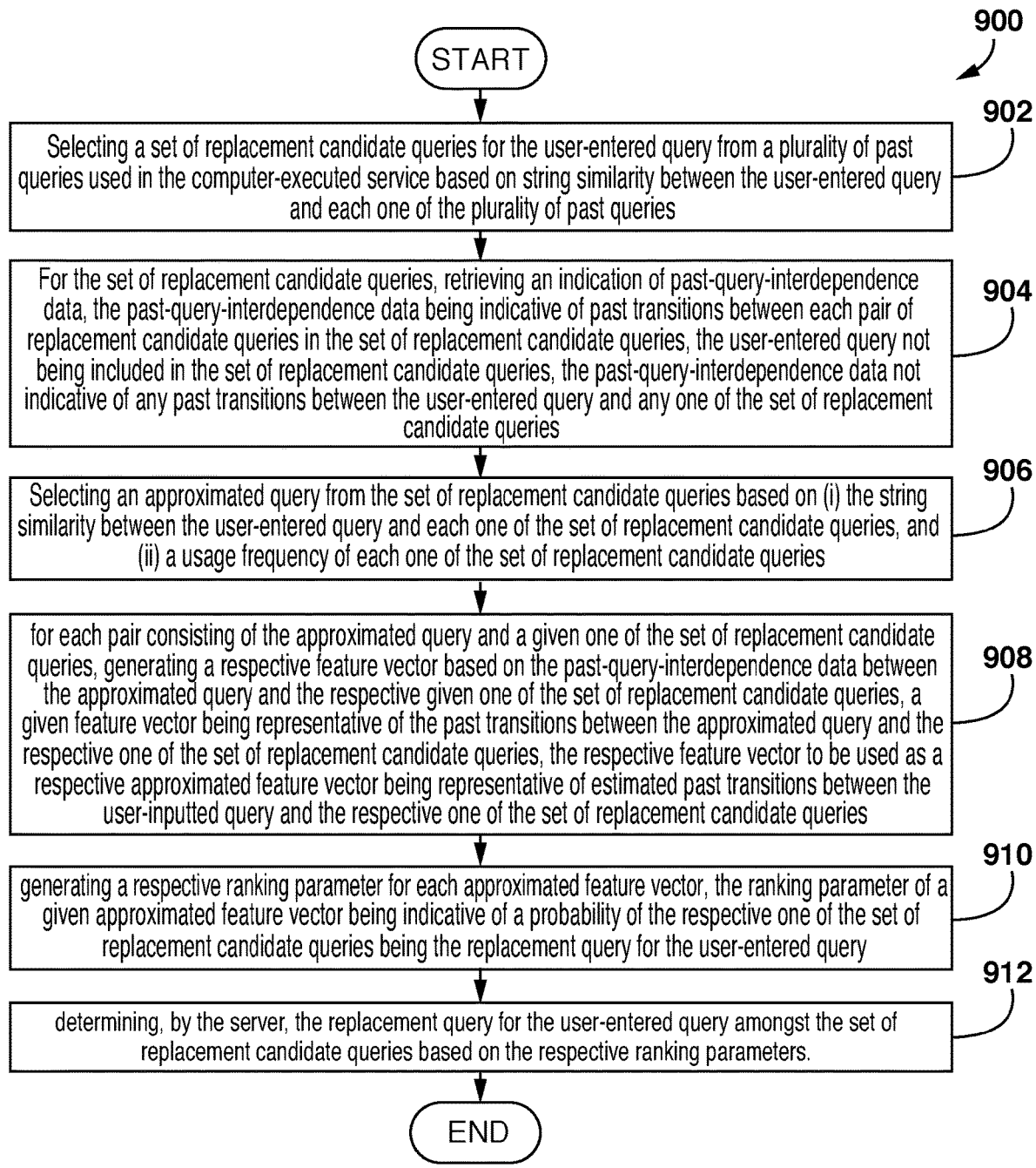
FIG. 9 is a block diagram depicting a flowchart of a method of generating a replacement query for a user-entered query according to some implementations of the present technology.

With reference to FIG. 9, there is depicted a flowchart of the method 900 of generating the replacement query for the user-entered query. The method 900 will now be described in further detail herein below.

Step 902: Selecting a Set of Replacement Candidate Queries for the User-entered Query from a Plurality of Past Queries The method 900 begins at step 902 with the server 230 selecting the set of replacement candidate queries 350 for the user-entered query from the plurality of past queries 300 used in the computer-executed service based on string similarity between the user-entered query and each one of the plurality of past queries 300.

With reference to FIG. 3, there is depicted the plurality of past queries 300 that is stored in the query log database 270. In order to execute the step 902, in some embodiments of the present technology, the server 230 may be configured to access the query log database 270 and retrieve the indication of the plurality of past queries 300 therefrom. As previously mentioned, the query log database 270 may store information relating to past queries that users have previously submitted to the server 230. As such, the plurality of past queries 300 may comprise past queries that users have previously submitted to or that were otherwise used by a given computer-executed service of the server 230.

The server 230 may be configured to evaluate string similarity between the user-entered query and each one of the plurality of past queries 300 by computing the edit distance between the user-entered query and each one of the plurality of past queries 300.

Generally speaking, the edit distance is a way of quantifying how dissimilar two character strings are to one another by counting a minimum number of operations required to transform one string into the other one. For example, the server 230 may be configured to compute the Levenshtein distance between the user-entered query and each one of the plurality of past queries 300. The Levenshtein distance is known in the art as a type of edit distance which allows deletion, insertion and substitution of characters.

In some embodiments, in order to select the set of replacement candidate queries 350, the server 230 may be configured to rank the plurality of past queries 300 according to the respective edit distances where a given one of the plurality of past queries 300 associated with a smallest edit distance is ranked first and another given one of the plurality of past queries 300 associated with a largest edit distance is ranked last. In this case, the server 230 may select, for example, at most 20 most highly ranked past queries from the plurality of past queries 300 as the set of replacement candidate queries 350.

Alternatively, in order to select the set of replacement candidate queries 350, the server 230 may be configured to compare the edit distance associated with each one of the plurality to past queries 300 with a predetermined edit distance threshold and select the past queries from the plurality of past queries 300 that are associated with respective edit distances that are lower than the predetermined edit distance threshold as the set of replacement candidate queries 350.

In some embodiments, the set of replacement candidate queries 350 may comprise only the most similar past queries (i.e., small edit distance) amongst the plurality of past queries 300 to the user-entered query.

Let it be assumed that based on string similarity between the user-entered query "oligopsony" and each one of the plurality of past queries 300, the server 230 selected four past queries 352, 354, 356 and 358, namely "oligophsony", "oligospoony", "oligopoly" and "oligophrenia", respectively, as part of the set of replacement candidate queries 350.

It should be noted that the server 230 selecting the past queries 352, 354, 356 and 358 as the set of replacement candidate queries 350 is described solely for the sake of simplicity and that, in other implementations, other past queries may be selected as the set of replacement candidate queries 350 and that another total number of past queries, other than four past queries, may be selected by the server 230 as part of the set of replacement candidate queries 350, without departing from the scope of the present technology.

For the description presented herein below, after the server 230 selected the set of replacement candidate queries 350 from the plurality of past queries 300, the past queries 352, 354, 356 and 358 are referred to as the replacement candidate queries 352, 354, 356 and 358, respectively, of the set of replacement candidate queries 350.

Step 904: For the Set of Replacement Candidate Queries, Retrieving an Indication of Past-query-interdependence Data The method 900 continues to step 904 with the server 230 being configured to, for the set of replacement candidate queries 350, retrieve the indication of past-query-interdependence data. The past-query-interdependence data is indicative of past transitions between each pair of replacement candidate queries in the set of replacement candidate queries 350.

The server 230 may be configured to retrieve the indication of the past-query-interdependence data for the set of replacement candidate queries 350 from the query log database 270. Generally speaking, the server 230 hosting one or more computer-executed services, such as search engines, may make use of historical information collected from a large quantity of previously executed queries that are submitted thereto and may store them in the query log database 270.

In some embodiments, the query log database 270 may comprise one or more collections of data relating to queries that users have previously submitted to the server 230. In other words, the server 230 may be configured to populate the query log database 270 based on user interactions with the computed-executed services hosted thereby. In other embodiments, however, the server 230 may be configured to communicate and use external resources in order to supplement the population of the query log database 270.

In some embodiments, the query log database 270 may be configured to store "past-query-specific data" associated with each past query submitted to the search engine of the server 230. For example, the past-query-specific data may comprise click-through data from past queries submitted to the search engine of the server 230. This click-through data may be stored in the form of records indicating that given documents have been clicked through by users of the search engine when they were exploring the search results for their respective past queries.

Additionally, the past-query-specific data may comprise additional statistical data associated with past query submissions to the search engine of the server 230. For example, the usage frequency of a given past query, which indicates how often a given past query has been submitted to the server 230, may be stored in the server 230 in association with the given past query.

In additional embodiments, the query log database 270 may be configured to store the "past-query-interdependence data" which is indicative of past transitions between a pair of past queries submitted to the search engine of the server 230. The past-query-interdependence data may be extracted from search session data associated with past search sessions initiated by users of the search engine.

The search session data may comprise information associated with a plurality of subsets of past queries that were submitted by users during distinct search sessions. The search session data may provide relational information regarding a given subset of past queries such as a sequence of past queries submitted by a given user within a given past search session, whether a given past query in a given past search session was explicitly corrected by the user (such as a submission of a subsequent past query substantially similar to the given past query), whether a given past query in the search session was implicitly corrected (such as when the search engine provided search results to the given user in response to a corrected past query instead of in response to the given past query and the given user significantly interacted with these search results), and the like.

Put another way, the past-query-interdependence data for a given past query may be indicative of past transitions, which can be retrieved by the server 230 from the query log database 270, between the given past query submitted to the search engine and every other past query submitted to the search engine. As such, the past-query-interdependence data for a given pair of past queries may be indicative of past transitions, which can be retrieved by the server 230 from the query log database 270, between a first past query within the given pair of past queries submitted to the search engine and a second past query within the given pair of past queries submitted to the search engine.

As such, in some embodiments of the present technology, the server 230 may retrieve the respective indication of the past-query-interdependence data for each pair of replacement candidate queries in the set of replacement candidate queries 350 by accessing the query log database 270.

It should be noted that, the user-entered query is not included in the set of replacement candidate queries 350 since the user-entered query has never been used by the server 230 and, therefore, the query log database 270 does not have any information regarding user interactions with the user-entered query. As a result, the past-query-interdependence data retrieved by the server 230 from the query log database 270 is not indicative of any past transitions between the user-entered query and any one of the set of replacement candidate queries 350.

Step 906: Selecting an Approximated Query from the Set of Replacement Candidate Queries Based on String Similarity and Usage Frequency The method 900 continues to step 906 with the server 230 being configured to select an approximated query from the set of replacement candidate queries 350 based on (i) the string similarity between the user-entered query and each one of the set of replacement candidate queries 350 and (ii) the usage frequency of each one of the set of replacement candidate queries 350 where the user frequency is based on previous user interactions with the computer-executed service.

It should be noted that the step 906, in some embodiments of the present technology, may be executable by the server 230 prior to or in parallel to the step 904.

According to the first scenario, with reference to FIG. 4, there is depicted the graphical representation 400 of the graph that maps (i) respective string similarities of each one of the set of replacement candidate queries 350 and the user-entered query and of (ii) respective usage frequencies of each one of the set of replacement candidate queries 350. The graphical representation 400 is defined by the usage frequency axis 402 and the string similarity axis 404.

There is depicted the acceptable approximation hypothesis region 410 which is bound by the string similarity axis 404, the usage frequency axis 402, the usage frequency threshold line 406 and the string similarity threshold line

408. It is to be appreciated that, if a given replacement candidate query is mapped within the acceptable approximation hypothesis region 410 based on its associated string similarity to the user-entered query and based on its usage frequency, the given replacement candidate query is selected as the approximated query that can be used by the server 230 for approximating the past-query-specific data and the past-query-interdependence data of the user-entered query.

Indeed, if the given replacement candidate query is mapped within the acceptable approximation hypothesis region 410, the given replacement candidate query is associated with acceptable values of the approximation hypothesis characteristics, namely with a given acceptable usage frequency value of the approximation hypothesis characteristic of the usage frequency and with a given acceptable string similarity value of the approximation hypothesis characteristic of the string similarity.

In the first scenario, as seen in FIG. 4, only the graphical marker 452, which is associated with the replacement candidate query 352, is mapped within the acceptable approximation hypothesis region 410. As such, the approximated query that is associated with the acceptable values of approximation hypothesis characteristics is the replacement candidate query 352.

In some embodiments of the present technology, instead of selecting a single approximated query, such as in the first scenario, the server 230 may be configured to select more than one approximated queries, such as in the second scenario.

According to the second scenario, with reference to FIG. 6, similarly to the first scenario, there is depicted the graphical representation 600 of the graph that maps respective string similarities of each one of the set of replacement candidate queries 350 and the user-entered query and of respective usage frequencies of each one of the set of replacement candidate queries 350.

Instead of the acceptable approximation hypothesis region 410 which is bound by the string similarity axis 404, the usage frequency axis 402, the usage frequency threshold line 406 and the string similarity threshold line 408, in this second scenario unlike the first scenario, there is depicted the acceptable approximation hypothesis region 610 which is bounded by the string similarity axis 404, the usage frequency axis 402, the usage frequency threshold line 606 and the string similarity threshold line 608.

Due to the usage frequency threshold value 609 being superior to the usage frequency threshold value 409 and to the usage frequency threshold value 607 being superior to the usage frequency threshold value 407, the acceptable approximation hypothesis region 610 occupies a larger surface on the graphical representation 600 than the acceptable approximation hypothesis region 410 on the graphical representation 400 of the graph.

In this second scenario, as seen in FIG. 6, the graphical markers 452 and 454, which are associated with the replacement candidate queries 352 and 354, respectively, are mapped within the acceptable approximation hypothesis region 610. As such, there are more than one, expressly in this case two, approximated queries (i.e., replacement candidate queries 352 and 354).

It should be noted that the approximated queries refer to all replacement candidate queries of the set of replacement candidate queries 350 which are associated with respective markers that are mapped within a given acceptable approximation hypothesis region.

In the first scenario, there is a single approximated query (i.e., the replacement candidate query 352). Hence, the server 230 may be configured to use the replacement candidate query 352 as the approximation of the user-entered query in the first scenario.

In the second scenario, there are more than one approximated queries (i.e., the replacement candidate queries 352 and 354). Hence, the server 230 may be configured to use the replacement candidate queries 352 and 354 for approximating information regarding the user-entered query in the second scenario.

Step 908: For Each Pair Consisting of the Approximated Query and a Given One of the Set of Replacement Candidate Queries, Generating a Respective Feature Vector The method 900 continues to step 908 with the server 230 configured to, for each pair consisting of the approximated query and a given one of the set of replacement candidate queries 350, generate a respective feature vector based on the past-query-interdependence data between the approximated query and the respective given one of the set of replacement candidate queries 350.

A given feature vector being representative of the past transitions between the approximated query and the respective one of the set of replacement candidate queries 350.

In the first scenario, the server 230 may be configured to use the respective feature vector as a respective approximated feature vector being representative of estimated past transitions between the user-inputted query and the respective one of the set of replacement candidate queries 350.

In the second scenario where the server 230 selects the more than one approximated query (instead of one approximated query), the server 230 may, for each pair consisting of a given one of the more than one approximated queries and a given one of the set of replacement candidate queries 350, generate a respective feature vector based on the past-query-interdependence data between the respective given one of the more than one approximated queries and the respective given one of the set of replacement candidate queries 350. In this case, a given feature vector is representative of the past transitions between the respective given one of the more than one approximated queries and the respective one of the set of replacement candidate queries 350.

In the second scenario, the server 230 may consolidate more than one feature vectors that are representative of the past transitions between each of the more than one approximated queries and a given one of the set of replacement candidate queries 350 into a respective consolidated feature vector.

In some embodiments, the server 230 may be configured to consolidate the more than one feature vectors into the respective consolidated feature vector by computing a respective mean vector based on the more than one feature vectors. In other embodiments, the server 230 may be configured to consolidate the more than one feature vectors into the respective consolidated feature vector by computing a respective average vector based on the more than one feature vectors.

In this case, the respective consolidated feature vector can be used as the respective approximated feature vector that is representative of the estimated past transitions between the user-inputted query and the respective one of the set of replacement candidate queries 350.

Step 910: Generating a Respective Ranking Parameter for Each Approximated Feature Vector The method 900 continues to step 910 with the server 230 being configured to generate a respective ranking parameter for each approximated feature vector. The ranking parameter of a given approximated feature vector is indicative of a probability of the respective one of the set of replacement candidate queries 350 being the replacement query for the user-entered query.

In some embodiments of the present technology, the server 230 may be configured to employ the ranking system as previously mentioned. For example, the server 230 can generate respective ranking parameters for the approximated feature vectors via an MLA. The MLA can be a linear ranker.

Step 912: Determining the Replacement Query for the User-entered Query Amongst the Set of Replacement Candidate Queries Based on the Respective Ranking Parameters The method 900 ends at step 912 with the server 230 determining the replacement query for the user-entered query amongst the set of replacement candidate queries 350 based on the respective ranking parameters.

In other words, after the server 230 determines the respective ranking parameters for each of the plurality of approximated feature vectors, the server 230 may identify a given approximated feature vector (amongst the plurality of approximated feature vectors) that is associated with the highest ranking parameter. As such, the server 230 may determine that the replacement query is a respective given one of the set of replacement candidate queries 350 that is associated with the given approximated feature vector.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating a replacement query for a user-entered query, the user-entered query having been received in association with a computer-executed service provided by a server, the user-entered query never having been used in the computer-executed service, the user-entered query being potentially erroneously entered, the method being executable by the server, the method comprising:
    selecting, by the server, a set of replacement candidate queries for the user-entered query from a plurality of past queries used in the computer-executed service based on string similarity between the user-entered query and each one of the plurality of past queries,
    for the set of replacement candidate queries, retrieving, by the server, an indication of past-query-interdependence data, the past-query-interdependence data being indicative of past transitions between each pair of replacement candidate queries in the set of replacement candidate queries,
    the user-entered query not being included in the set of replacement candidate queries, the past-query-interdependence data not indicative of any past transitions between the user-entered query and any one of the set of replacement candidate queries;
    selecting, by the server, an approximated query from the set of replacement candidate queries based on:
        (i) the string similarity between the user-entered query and each one of the set of replacement candidate queries; and
        (ii) a usage frequency of each one of the set of replacement candidate queries, the user frequency being based on previous user interactions with the computer-executed service;
    for each pair consisting of the approximated query and a given one of the set of replacement candidate queries,
        generating, by the server, a respective feature vector based on the past-query-interdependence data between the approximated query and the respective given one of the set of replacement candidate queries, a given feature vector being representative of the past transitions between the approximated query and the respective one of the set of replacement candidate queries;
    the respective feature vector to be used as a respective approximated feature vector being representative of estimated past transitions between the user-inputted query and the respective one of the set of replacement candidate queries;
    generating, by the server, a respective ranking parameter for each approximated feature vector, the ranking parameter of a given approximated feature vector being indicative of a probability of the respective one of the set of replacement candidate queries being the replacement query for the user-entered query;
    determining, by the server, the replacement query for the user-entered query amongst the set of replacement candidate queries based on the respective ranking parameters.

2. The method of claim 1, wherein the selecting the approximated query from the set of replacement candidate queries comprises selecting, by the server, more than one approximated queries from the set of replacement candidate queries, and wherein
    for each pair consisting of a given one of the more than one approximated queries and a given one of the set of replacement candidate queries,
    the generating the respective feature vector comprises generating, by the server, the respective feature vector based on the past-query-interdependence data between the respective given one of the more than one approximated queries and the respective given one of the set of replacement candidate queries, the given feature vector being representative of the past transitions between the respective given one of the more than one approximated queries and the respective one of the set of replacement candidate queries; and wherein
    the method further comprises consolidating, by the server, more than one feature vectors being representative of the past transitions between each of the more than one approximated queries and a given one of the set of replacement candidate queries into a respective consolidated feature vector;
    the respective consolidated feature vector to be used as the respective approximated feature vector being representative of the estimated past transitions between the user-inputted query and the respective one of the set of replacement candidate queries.

3. The method of claim 1, wherein the selecting the set of replacement candidate queries for the user-entered query from the plurality of past queries used in the computer-executed service based on string similarity between the user-entered query and each one of the plurality of past queries comprises
    computing, by the server, an edit distance between the user-entered query and each one of the plurality of past queries.

4. The method of claim 3, wherein the edit distance is a Levenshtein distance.

5. The method of claim 4, wherein the plurality of past queries are ranked based on the respectively associated Levenshtein distances and wherein the selecting the set of replacement candidate queries comprises selecting, by the server, a predetermined number of most highly ranked past queries of the plurality of past queries.

6. The method of claim 2, wherein the selecting the more than one approximated queries from the set of replacement candidate queries comprises:

mapping, by the server, each one of the set of replacement candidate queries based on (i) the string similarity to the user-entered query and (ii) the usage frequency; and selecting, by the server, all replacement candidate queries of the set of replacement candidate queries that are mapped in an acceptable approximation hypothesis region as the more than one approximated queries, the acceptable approximation hypothesis region being bound by a usage frequency threshold line and a string similarity threshold line.

7. The method of claim 6, wherein the usage frequency threshold line coincides with a usage frequency threshold value, all usage frequency values being at least one of equal and lower to the usage frequency threshold value being acceptable usage frequency values of an approximation hypothesis characteristic of the usage frequency, and wherein the string similarity threshold line coincides with a string similarity threshold line, all string similarity values being at least one of equal and lower to the string similarity threshold value being acceptable string similarity values of an approximation hypothesis characteristic of the string similarity.

8. The method of claim 7, wherein the consolidating the more than one feature vectors into the respective consolidated feature vector comprises at least one of:

computing, by the server, a mean vector based on the more than one feature vectors; and computing, by the server, an average vector based on the more than one feature vectors.

9. The method of claim 1, wherein the generating the respective ranking parameter for each approximated feature vector is executable by a machine learned algorithm (MLA).

10. The method of claim 9, wherein the MLA is a linear ranker.

11. A server for generating a replacement query for a user-entered query, the user-entered query having been received in association with a computer-executed service provided by the server, the user-entered query never having been used in the computer-executed service, the user-entered query being potentially erroneously entered, the server being configured to:

select a set of replacement candidate queries for the user-entered query from a plurality of past queries used in the computer-executed service based on string similarity between the user-entered query and each one of the plurality of past queries, for the set of replacement candidate queries, retrieve an indication of past-query-interdependence data, the past-query-interdependence data being indicative of past transitions between each pair of replacement candidate queries in the set of replacement candidate queries, the user-entered query not being included in the set of replacement candidate queries, the past-query-interdependence data not indicative of any past transitions between the user-entered query and any one of the set of replacement candidate queries;

select an approximated query from the set of replacement candidate queries based on:
  (i) the string similarity between the user-entered query and each one of the set of replacement candidate queries; and
  (ii) a usage frequency of each one of the set of replacement candidate queries, the user frequency being based on previous user interactions with the computer-executed service;

for each pair consisting of the approximated query and a given one of the set of replacement candidate queries, generate a respective feature vector based on the past-query-interdependence data between the approximated query and the respective given one of the set of replacement candidate queries, a given feature vector being representative of the past transitions between the approximated query and the respective one of the set of replacement candidate queries;

the respective feature vector to be used as a respective approximated feature vector being representative of estimated past transitions between the user-inputted query and the respective one of the set of replacement candidate queries;

generate a respective ranking parameter for each approximated feature vector, the ranking parameter of a given approximated feature vector being indicative of a probability of the respective one of the set of replacement candidate queries being the replacement query for the user-entered query;

determine the replacement query for the user-entered query amongst the set of replacement candidate queries based on the respective ranking parameters.

12. The server of claim 11, wherein the server is configured to select the approximated query from the set of replacement candidate queries comprises the server being configured to select more than one approximated queries from the set of replacement candidate queries, and wherein for each pair consisting of a given one of the more than one approximated queries and a given one of the set of replacement candidate queries, the server is configured to generate the respective feature vector comprises the server being configured to generate the respective feature vector based on the past-query-interdependence data between the respective given one of the more than one approximated queries and the respective given one of the set of replacement candidate queries, the given feature vector being representative of the past transitions between the respective given one of the more than one approximated queries and the respective one of the set of replacement candidate queries; and wherein the server is further configured to consolidate more than one feature vectors being representative of the past transitions between each of the more than one approximated queries and a given one of the set of replacement candidate queries into a respective consolidated feature vector;

the respective consolidated feature vector to be used as the respective approximated feature vector being representative of the estimated past transitions between the user-inputted query and the respective one of the set of replacement candidate queries.

13. The server of claim 11, wherein the server is configured to select the set of replacement candidate queries for the user-entered query from the plurality of past queries used in the computer-executed service based on string similarity between the user-entered query and each one of the plurality of past queries comprises the server being configured to
compute an edit distance between the user-entered query and each one of the plurality of past queries.

14. The server of claim 13, wherein the edit distance is a Levenshtein distance.

15. The server of claim 14, wherein the plurality of past queries are ranked based on the respectively associated Levenshtein distances and wherein the server is configured to select the set of replacement candidate queries comprises the server being configured to select a predetermined number of most highly ranked past queries of the plurality of past queries.

16. The server of claim 12, wherein the server is configured to select the more than one approximated queries from the set of replacement candidate queries comprises the server being configured to:
map each one of the set of replacement candidate queries based on (i) the string similarity to the user-entered query and (ii) the usage frequency; and
select all replacement candidate queries of the set of replacement candidate queries that are mapped in an acceptable approximation hypothesis region as the more than one approximated queries, the acceptable approximation hypothesis region being bound by a usage frequency threshold line and a string similarity threshold line.

17. The server of claim 16, wherein
the usage frequency threshold line coincides with a usage frequency threshold value, all usage frequency values being at least one of equal and lower to the usage frequency threshold value being acceptable usage frequency values of an approximation hypothesis characteristic of the usage frequency, and wherein
the string similarity threshold line coincides with a string similarity threshold line, all string similarity values being at least one of equal and lower to the string similarity threshold value being acceptable string similarity values of an approximation hypothesis characteristic of the string similarity.

18. The server of claim 17, wherein the server is configured to consolidate the more than one feature vectors into the respective consolidated feature vector comprises the server being configured to at least one of:
compute a mean vector based on the more than one feature vectors; and
compute an average vector based on the more than one feature vectors.

19. The server of claim 11, wherein the server is configured to generate the respective ranking parameter for each approximated feature vector by executing a machine learned algorithm (MLA).

20. The server of claim 19, wherein the MLA is a linear ranker.

* * * * *